United States Patent
Martens

(10) Patent No.: US 12,469,593 B1
(45) Date of Patent: Nov. 11, 2025

(54) COMPUTER-BASED SYSTEMS WITH IMPLEMENTING A SOFTWARE PLATFORM AND METHODS OF USE THEREOF

(71) Applicant: THE FEINSTEIN INSTITUTES FOR MEDICAL RESEARCH, INC., Manhasset, NY (US)

(72) Inventor: Timothy Martens, Manhasset, NY (US)

(73) Assignee: THE FEINSTEIN INSTITUTES FOR MEDICAL RESEARCH, INC., Manhasset, NY (US)

(*) Notice: Subject to any disclaimer, the term of this patent is extended or adjusted under 35 U.S.C. 154(b) by 29 days.

(21) Appl. No.: 18/643,133

(22) Filed: Apr. 23, 2024

(51) Int. Cl.
G16H 40/20 (2018.01)
G16H 10/60 (2018.01)
G16H 40/67 (2018.01)
G16H 50/30 (2018.01)

(52) U.S. Cl.
CPC .......... G16H 40/20 (2018.01); G16H 10/60 (2018.01); G16H 40/67 (2018.01); G16H 50/30 (2018.01)

(58) Field of Classification Search
CPC ........ G16H 40/20; G16H 40/60; G16H 40/67; G16H 50/00; G16H 50/20; G16H 50/30; G16H 50/50; G16H 50/70; G16H 10/00; G16H 10/60; G16H 20/00; G16H 20/17; G16H 20/70; G16H 70/00; G16H 70/20; G16H 70/60; G16H 80/00; G16H 30/20; G16H 15/00; A61B 5/22; A61B 5/7267; A61B 5/7475; A61B 5/7275; A61B 5/021; A61B 5/742; A61B 5/205; A61B 5/2405; A61B 5/02; A61B 5/7264; A61B 5/06

USPC .............................................. 705/2, 3, 28, 7
See application file for complete search history.

(56) References Cited

U.S. PATENT DOCUMENTS

| | | | |
|---|---|---|---|
| 10,832,819 B2 | 11/2020 | Simon et al. | |
| 11,864,944 B2 | 1/2024 | Fornwalt et al. | |
| 11,880,888 B1 * | 1/2024 | Gold | G06Q 10/00 |
| 2018/0107791 A1 | 4/2018 | Guo et al. | |
| 2020/0381127 A1 * | 12/2020 | Silverman | G16H 50/50 |

(Continued)

FOREIGN PATENT DOCUMENTS

WO WO-2025081112 A1 * 4/2025 ........... G06T 7/0012

*Primary Examiner* — Bion A Shelden
*Assistant Examiner* — Robert Anthony Skrobarczyk
(74) *Attorney, Agent, or Firm* — Greenberg Traurig, LLP

(57) ABSTRACT

A method and a system include at least one processor of a plurality of computing devices that execute a plurality of heart disease triage (HDT) microservices operating on a scalable data container orchestration platform. The platform is configured to continuously receive a plurality of patient-specific data files that include medical data and provider visit data for each patient. Patient-specific diagnostic text of the medical history, the provider visit, and echocardiogram data in the patient-specific data files of patients identified as having echocardiogram data are tokenized using a feature-space transformation to generate a patient-specific tokenized diagnostic feature set. The patient-specific tokenized diagnostic feature set for each identified patient is inputted to an HD severity determination machine learning model to generate a heart disease (HD) severity score. A triage scoring algorithm based on the HD severity score and provider visit data are used to generate a triage score for each identified patient.

20 Claims, 20 Drawing Sheets

(56) References Cited

U.S. PATENT DOCUMENTS

| | | | |
|---|---|---|---|
| 2023/0215560 A1* | 7/2023 | Roh | G16H 10/60 |
| | | | 705/2 |
| 2023/0245777 A1* | 8/2023 | Foschini | G16H 50/30 |
| | | | 705/2 |
| 2023/0253082 A1* | 8/2023 | Ginsburg | G16H 40/20 |
| | | | 705/3 |

* cited by examiner

STRUCTURAL HD CARD 810

DEMO (Same as CHD)

| SHD | | STENOSIS | REGURG | STATUS |
|---|---|---|---|---|
| EMBED | AORTIC VALVE | 1 | 1 | 2 |
| I | MITRAL VALVE | 1 | 1 | 2 |
| | PULMONARY VALVE | 1 | 1 | 2 |
| | TRICUSPID VALVE | 1 | 1 | 2 |
| | LPA | | | 2 |
| | RPA | 1 | | 2 |
| | CoA | 1 | | 2 |

| IMPLANTS | LOCATION | DEVICE | DATE IN | DATE OUT |
|---|---|---|---|---|
| II | 3 → | □ | □ | □ |

1 NLP on most recent SYNGO report
- none (0)
- (trivial/physiologic (0))
- mild (1)
- mild-mod (2)
- moderate (2.5)
- mod-sev (3)
- severe (4)
2 unknown (default)
- native
- Balloon/stent
- repaired
- replaced
- removed 3 REV CHRONOLOGIC
- AORTIC VALVE
- MITRAL VALVE
- PULMONARY VALVE
- TRICUSPID VALVE
- LPA
- RPA
- CoA
- PDA
- ASD
- VSD
- Need implant LIB for each position EVENTS
- ED VISIT
- Hospital admission
- ICU admission
- Operative intervention
- CASH intervention

EVENT
- CATH
- OR
- HOSP
- ICU

SEVERITY SCALE: 0 1 2 3 4

TODAY

| 910 FUND | 915 W1 | 920 SUB | 925 W2 | QUAL | 930 STATUS | 935 W3 | Definition/Note | ICD-10 |
|---|---|---|---|---|---|---|---|---|
| APW | 3 | Aortopulmonary window (isolated) | 0 | | Unrepaired | 3 | | Q21.4 |
| | | Aortopulmonary window + Complex CHD | 2 | | Repaired 2v | 0 | | |
| | | | | | Palliated 2v | 1 | | |
| | | | | | Palliated 1.5 | 2 | | |
| | | | | | Palliated 1v | 3 | | |
| ASD | 0 | PFO | 0 | | Unrepaired | 1 | | Q21.1 |
| | | Secundum | 1 | | Repaired (surgery) 2v | 0 | | Q21.1 |
| | | Sinus venosus | 2 | | Repaired (cath) 2v | 0 | | Q21.1 |
| | | Coronary sinus | 1 | | Palliated 2v | 1 | | Q21.1 |
| | | Common atrium | 1 | | Palliated 1.5 | 1 | | |
| | | | | | Palliated 1v | 3 | | |
| | | | | | Resolved | 0 | | |
| AVC | 2 | Complete | 2 | | Unrepaired | 3 | code CoA separately | Q21.2 |
| | | Transitional | 1 | | Repaired 2v | 1 | | Q21.2 |
| | | Partial - No VSD | 0 | | Palliated 2v | 2 | | Q21.2 |
| | | Partial - No ASD | 0 | | Palliated 1.5 | 2 | | |
| | | | | | Palliated 1v | 2 | | |
| | | | | | Resolved | 0 | | |
| CARDIOMYOPATHY | 4 | Restrictive | 2 | Listed Txp | Medical Management | 1 | | I42.5 |
| | | Dilated, idiopathic | 1 | Not Listed | Transplanted | 3 | | I42.0 |
| | | HCM | 1 | | VAD | 3 | | I42.2 |
| | | Metabolic/Genetic | 1 | | ECMO | 0 | | B33.24 |
| | | Viral Myocarditis | 0 | | Palliated 2v | 2 | | |
| | | End Stage CHD | 3 | | Palliated 1.5 | 2 | | |
| | | | | | Palliated 1v | 3 | | |
| | | | | | Resolved | 0 | | |

FUND 0-5
SUB 0-2
STATUS 0-3
SCORE 0-10

| FUND | W1 | SUB | W2 | QUAL | STATUS | W3 | Definition/Note | ICD-10 |
|---|---|---|---|---|---|---|---|---|
| CoA and Arch | 2 | Discrete (juxtaductal) CoA | 0 | | Unrepaired | 2 | | Q25.1 |
| | | | | | | | | Q25.1, Q21.0 |
| | | Discrete (juxtaductal) CoA + VSD | 1 | | Repaired 2v | 1 | | Q25.42 |
| | | Hypoplastic arch | 1 | | Repaired (cath) 2v | 1 | | Q25.1 |
| | | Hypoplastic arch + VSD | 2 | | Palliated 2v | 2 | | Q25.1 |
| | | IAA | 2 | | Palliated 1.5 | 2 | | Q25.21 |
| | | IAA + VSD | 2 | | Palliated 1v | 3 | | Q25.21, Q21.0 |
| | | IAA + APW | 2 | | Resolved | 0 | | Q25.21, Q21.4 |
| CORONARY | 2 | AAOCA | 1 | | Unrepaired | 1 | | Q24.5 |
| | | ALCAPA | 2 | | Repaired 2v | 1 | | Q24.5 |
| | | ARCAPA | 2 | | Palliated 2v | 1 | | Q24.5 |
| | | Fistula | 0 | | Palliated 1.5 | 2 | | Q24.5 |
| | | Aneurysm | 1 | | Palliated 1v | 3 | | Q24.5 |
| | | Other (ostial atresia, hypopl, calcinosis) | 0 | | Resolved | 0 | | Q24.5 |
| CorTri | 1 | Dextrum | 0 | | Unrepaired | 1 | | Q24.2 |
| | | Sinistrum | 2 | | Repaired 2v | 1 | | Q24.2 |
| | | | | | Palliated 2v | 1 | | |
| | | | | | Palliated 1.5 | 2 | | |
| | | | | | Palliated 1v | 3 | | |
| DOLV | 3 | DOLV | 2 | | Resolved | 0 | | Q20.2 |
| | | | | | Unrepaired | 3 | | |
| | | | | | Repaired 2v | 1 | | |
| | | | | | Palliated 2v | 2 | | |
| | | | | | Palliated 1.5 | 2 | | |
| | | | | | Palliated 1v | 3 | | |
| DORV | 3 | TOF type | 1 | | Unrepaired | 3 | | Q20.1 |
| | | TGA type | 1 | | Repaired 2v | 1 | | Q20.1 |
| | | Doubly committed VSD | 1 | | Palliated 2v | 2 | | Q20.1 |
| | | Remote VSD | 2 | | Palliated 1.5 | 2 | | Q20.1 |
| | | DORV + AVSD (2v) | 1 | | Palliated 1v | 3 | | Q20.1 |
| | | IVS | 1 | | | | | Q20.1 |

900

| 910 FUND | 915 W1 | 920 SUB | 925 W2 | QUAL | 930 STATUS | 935 W3 | Definition/Note | ICD-10 |
|---|---|---|---|---|---|---|---|---|
| HETEROTAXY | 1 CHD | Asplenia (R isomerism) + complex | 2 | | | | | Q24.4 |
| | | Polysplenia (L isomerism) simple/no CHD | 0 | | | | | Q23.0 |
| | | Polysplenia (L isomerism) complex CHD | 2 | | | | | Q25.3 |
| LVOT and Root | 2 | Aortic stenosis, subvalvar | 1 | | Unrepaired | 1 | | Q23.1 |
| | | Aortic Stenosis, valvar | 1 | | Repaired 2v | 1 | | Q23.0, |
| | | Aortic stenosis, supravalvar | 1 | | Palliated 2v | 2 | | Q23.1 |
| | | Sinus of Valsalva aneurysm | 0 | | Palliated 1.5 | 2 | | Q25.43 |
| | | Aorto-LV or RV Tunnel | 1 | | Palliated 1v | 3 | | |
| | | | | | Resolved | 0 | | |
| MV | 2 | Supravalvar (ring) stenosis | 2 | | Unrepaired | 1 | | Q23.2 |
| | | Valvar +/- subvalvar stenosis | 1 | | Repaired 2v | 1 | | Q23.2 |
| | | Isolated Cleft MV | 0 | | Palliated 2v | 2 | | Q23.2 |
| | | Primary congenital regurgitation | 1 | | Palliated 1.5 | 2 | | Q23.2, |
| | | | | | Palliated 1v | 3 | | Q23.3 |
| | | | | | Resolved | 0 | | Q23.3 |
| PAPVC | 1 | R-sided vein(s) | 0 | ASD | Unrepaired | 1 | | Q26.3 |
| | | L-sided vein(s) | 0 | No ASD | Repaired 2v | 1 | | Q26.3 |
| | | Bilateral veins | 1 | | Palliated 2v | 2 | | Q26.3 |
| | | Scimitar | 2 | | Palliated 1.5 | 2 | | Q26.3 |
| | | | | | Palliated 1v | 3 | | |
| PArt | 2 | supravalvar stenosis | 1 | | Unrepaired | 1 | | Q25.6 |
| | | Branch PA stenosis | 1 | | Repaired 2v | 1 | | Q25.6 |
| | | Discontinuous (ductal) PA | 0 | | Palliated 2v | 2 | | Q25.6 |
| | | Hemitruncus (PA from AscAo) | 2 | | Palliated 1.5 | 2 | | Q25.7 |
| | | | | | Palliated 1v | 3 | | Q25.7 |
| | | | | | Resolved | 0 | | |

FIG. 9 (CONT'D)

| FUND 910 | W1 915 | SUB 920 | W2 925 | QUAL | STATUS 930 | W3 935 | Definition/Note | ICD-10 |
|---|---|---|---|---|---|---|---|---|
| PA-IVS | 5 | PA-IVS | 1 | | Unrepaired | 3 | | Q22.0, Q25.5 |
| | | PA-IVS + RV dependent Coronaries | 2 | | Repaired (surgery) 2v | 1 | | |
| | | | | | Repaired (cath) 2v | 1 | | |
| | | | | | Palliated (surgery) 2v | 2 | | |
| | | | | | Palliated (cath) 2v | 2 | | |
| | | | | | Palliated 1.5 | 2 | | |
| | | | | | Palliated 1v | 3 | | |
| PHTN | 1 | 3 meds | 3 | | Confirmed | 1 | | I27 |
| | | 2 meds | 2 | | Palliated 2v | 3 | | |
| | | 1 med | 1 | | Resolved | 0 | | |
| | | No Meds | 0 | | | | | |
| RHYTHM | 2 | Heart block, congenital | 2 | AICD | No Pacemaker | 0 | | Q24.6 |
| | | Heart block, acquired | 2 | No AICD | Pacemaker, temporary | 0 | | Q24.6 |
| | | Vtach/VF | 1 | | Epicardial, single chamber | 2 | | |
| | | Other | 0 | | Epicardial, dual chamber | 2 | | |
| | | | | | Epicardial, BiV | 2 | | |
| | | | | | Transvenous, single chamber | 2 | | |
| | | | | | Transvenous, dual chamber | 2 | | |
| | | | | | Transvenous, BiV | 2 | | |
| | | | | | Leadless | 2 | | |
| FUND | W1 | SUB | W2 | QUAL | STATUS | W3 | Definition/Note | ICD-10 |
| RVOT and PV | 2 | PS - Valvar | 1 | | Unrepaired | 1 | | Q22.1 |
| | | PS - Subvalvar | 0 | | Repaired 2v | 1 | | Q22.2 |
| | | DCRV | 0 | | Palliated 2v | 2 | code VSD separately | Q22.3 |
| | | | | | Palliated 1.5 | 2 | | Q24.3 |
| | | | | | Palliated 1v | 3 | | Q24.3 |
| | | | | | Resolved | 0 | | |

| FUND | W1 | SUB | W2 | QUAL | STATUS | W3 | Definition/Note | ICD-10 |
|---|---|---|---|---|---|---|---|---|
| SingleV | 5 | HLHS | 2 | | | | code TAPvc separately | Q23.4 |
| | | DLV | 2 | | Unrepaired | 3 | | Q20.4 |
| | | DRV | 2 | | Palliated 1v - Interstage | 3 | | Q20.4 |
| | | Mitral atresia | 2 | | Palliated 1v - BDG | 2 | | Q23.2 |
| | | Tricuspid atresia | 2 | | Palliated 1v - Fontan | 2 | | Q22.4 |
| | | Unbalanced AVC | 2 | | Biventricular Conversion | 1 | | |
| | | Other | 2 | | Transplanted | 2 | | |
| Shone's | 4 | Incomplete (2 or 3) | 2 | | Unrepaired | 3 | code HLHS if clear 1v | |
| | | Complete (all 4) | 2 | | Repaired 2v | 1 | | |
| | | | | | Palliated 2v | 2 | | |
| | | | | | Palliated 1.5 | 2 | | |
| | | | | | Palliated 1v - Interstage | 3 | | |
| | | | | | Palliated 1v - BDG | 3 | | |
| | | | | | Palliated 1v - Fontan | 2 | | |
| | | | | | Resolved | 0 | | |
| Surveillance | 1 | Connective Tissue Disorder | 2 | | | 3 | | Q87.4, Q79.6 |
| | | bAV - functionally near normal | 0 | | | | | |
| | | Kawasaki disease | 1 | | | | | |
| | | Covid MIS-C | 1 | | | | | M30.3 |
| | | ChemoRx - Risk for CMPY | 0 | | | | | |
| TAPVC | 3 | supracardiac | 1 | Obstructed | Unrepaired | 3 | | Q26.2 |
| | | | 0 | Not Obstructed | Repaired 2v | 1 | | Q26.2 |
| | | cardiac | 2 | | Palliated 2v | 2 | | Q26.2 |
| | | infracardiac | 1 | | Palliated 1.5 | 2 | | Q26.2 |
| | | mixed | | | Palliated 1v | 3 | | |
| TGA | 3 | IVS | 0 | LVOTO | Unrepaired | 3 | | Q20.3 |
| | | IVS-CoA | 1 | No LVOTO | Repaired 2v | 0 | | Q20.3 |
| | | VSD | 0 | | Palliated 2v | 2 | | Q20.3 |
| | | | | | | | | Q21.0 |
| | | VSD-CoA | 2 | | Palliated 1.5 | 2 | | Q20.3, Q21.0 |
| | | | | | Palliated 1v | 3 | | Q21.0 |

FIG. 9 (CONT'D)

| FUND 910 | W1 915 | SUB 920 | W2 925 | QUAL | STATUS 930 | W3 935 | Definition/Note | ICD-10 |
|---|---|---|---|---|---|---|---|---|
| TGA-cc | 3 | IVS | 0 | Ebstein's | Unrepaired | 2 | | Q20.5 |
| | | IVS-CoA | 2 | No Ebstein's | Repaired 2v | 1 | | Q20.5 |
| | | VSD | 1 | | Palliated 2v | 1 | | Q20.5 |
| | | VSD-CoA | 2 | | Palliated 1.5 | 2 | | Q20.5 |
| | | | | | Palliated 1v | 3 | | |
| TOF | 2 | Pulmonary Stenosis | 0 | | Unrepaired | 2 | | |
| | | TOF+APV | 2 | | Repaired 2v (valve-sparing) | 0 | | |
| | | TOF+AVC | 1 | | Repaired 2v (TAP) | 1 | | Q22.0 |
| | | | | | Palliated (cath) 2v | 2 | | Q25.5 |
| | | | | | Palliated (surg) 2v | 2 | | Q22.0 |
| | | | | | Palliated 1.5v | 2 | | Q25.5 |
| ToF w PAtresia | 4 | PA-VSD-Med PAs -No MAPCAs | 0 | | Unrepaired | 3 | | |
| | | PA-VSD-Med PAs -MAPCAs | 1 | | Repaired 2v (conduit) | 1 | | |
| | | PA-VSD-No PAs-MAPCAs | 2 | | Palliated 2v, shunted | 2 | | |
| | | | | | Palliated 2v, unifocalized | 2 | | |
| | | | | | Palliated 1.5 | 2 | | |
| TRUNCUS | 4 | Truncus arteriosus, type A1 | 0 | | Unrepaired | 2 | | Q20.0 |
| | | Truncus arteriosus, type A2 | 1 | | Repaired 2v | 0 | | |
| | | Truncus arteriosus, type A3 | 1 | | Palliated 2v | 1 | | |
| | | Truncus arteriosus, type A4 | 2 | | | | | |
| TUMOR | 2 | Cardiac tumor | 0 | | Unrepaired | 2 | | C38.0 |
| | | Cardiac tumor + Tuberous Sclerosis | | | Repaired 2v | 1 | | D15.1 |
| | | | | | Palliated 2v | 3 | | |
| | | | | | Palliated 1.5 | 3 | | |
| | | | | | Palliated 1v | 3 | | |
| | | | | | Resolved | 0 | | |

FIG. 9 (CONT'D)

| 910 | 915 | 920 | 925 | QUAL | 930 | 935 | Definition/Note | ICD-10 |
|---|---|---|---|---|---|---|---|---|
| FUND | W1 | SUB | W2 | | STATUS | W3 | | |
| TV | 2 | Ebstein's anomaly | 2 | | Unrepaired | 1 | | Q22.5 |
| | | Primary congenital regurgitation | 1 | | Repaired 2v | 0 | | Q22.8 |
| | | Primary congenital stenosis | 1 | | Palliated 2v | 1 | | Q22.4 |
| | | | | | Palliated 1.5 | 2 | | Q22.8 |
| | | | | | Palliated 1v | 3 | | |
| | | | | | Resolved | 0 | | |
| VMAL | 0 | PDA | 0 | | Unrepaired | 1 | | Q25.0 |
| | | Vascular Ring | 2 | | Repaired 2v | 0 | | Q25.4 |
| | | PA Sling | 2 | | Palliated 2v | 1 | | Q25.7 |
| | | Primary PV stenosis | 1 | | Palliated 1.5 | 2 | | Q26.8 |
| | | Systemic venous anomaly | 0 | | Palliated 1v | 3 | | Q26.8 |
| | | Aberrant subclavian artery - No Ring | 0 | | Resolved | 0 | | Q25.48 |
| VSD | 0 | Type 1, Doubly Committed (subpulmonary) | 1 | | Unrepaired | 1 | | Q21.0 |
| | | Type 2, Membranous | 1 | | Repaired 2v | 0 | | Q21.0 |
| | | Type 3, Inlet or AV canal (wo CAVv) | 1 | | Palliated 2v | 3 | | Q21.0 |
| | | Type 4, Muscular | 0 | | Palliated 1.5 | 3 | | Q21.0 |
| | | Gerbode (LV-RIGHT ATRIUM shunt) | 0 | | Palliated 1v | 3 | | Q21.0 |
| | | Multiple | 1 | | Resolved | 0 | | Q21.0 |

FIG. 9 (CONT'D)

2000 executing, by at least one processing device of a plurality of computing devices, a plurality of heart disease triage (HDT) microservices operating on a scalable data container orchestration platform; where the scalable data container orchestration platform, includes at least one load balancer, and is configured to: 2005 dynamically scale a number of computing devices based on data traffic assessed by the at least one load balancer for the plurality of HDT microservices to maximize computational and load efficiencies in the plurality of computing devices 2010 interact with a plurality of backend computing devices associated with a plurality of providers through an application programming interface (API) layer including a plurality of APIs 2020 relay data associated with a plurality of patients between any of the plurality of backend computing devices and the plurality of HDT microservices 2030

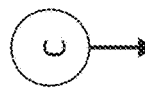

where the scalable data container orchestration platform is programmed to: 2040 generate a triage-score patient severity list ranked from a highest triage score to a lowest triage score, for each identified patient associated with each identified patient-specific data file from the plurality of identified patient-specific data files; where the triage-score patient severity list indicates a set of the plurality of identified patients that should first receive urgent care 2110 transmit, via the API layer, at least one displaying instruction, to at least one specific backend computing devices from the plurality of backend computing devices associated with at least one specific provider from the plurality of providers that provided cardiac medical care to any of the plurality of identified patients in the set, that causes to display on a graphical user interface (GUI) on at least one display of the specific backend computing devices: the triage-score patient severity list, an urgent medical care alert for each identified patient in the set, or both 2120

FIG. 10 (CONT'D)

COMPUTER-BASED SYSTEMS WITH IMPLEMENTING A SOFTWARE PLATFORM AND METHODS OF USE THEREOF

FIELD OF TECHNOLOGY

The present disclosure generally relates to computer-based systems for implementing a software platform and methods of use thereof.

BACKGROUND

The healthcare landscape is undergoing a digital transformation with a growing focus on technology solutions to enhance patient care, diagnostics, and treatment delivery. Centralized health care management systems are at the forefront of this transformation, offering tools for data analysis, decision support, and communication. However, their effectiveness is based on a seamless integration with diverse medical devices used in hospitals, clinics, and for patient monitoring.

SUMMARY

In some embodiments, the present disclosure provides an exemplary technically improved computer-based method that may include executing, by at least one processing device of a plurality of computing devices, a plurality of heart disease triage (HDT) microservices operating on a scalable data container orchestration platform; where the scalable data container orchestration platform, includes at least one load balancer, and may be configured to: dynamically scale a number of computing devices based on data traffic assessed by the at least one load balancer for the plurality of HDT microservices to maximize computational and load efficiencies in the plurality of computing devices, interact with a plurality of backend computing devices associated with a plurality of providers through an application programming interface (API) layer comprising a plurality of APIs, and relay data associated with a plurality of patients between any of the plurality of backend computing devices and the plurality of HDT microservices. The scalable data container orchestration platform is programmed to continuously receive over a communication network, from a plurality of electronic resources, a plurality of patient-specific data files associated with the plurality of patients; where each of the plurality of patient-specific data files may include at least one patient-specific data record associated with a patient from the plurality of patients; where the at least one patient-specific data record may include: a medical history record of the patient, and at least one date of at least one visit to at least one provider that provided cardiac medical care to the patient; assign each patient-specific data file from the plurality of patient-specific data files to any of the plurality of HDT microservices based on scaling of the number of computing devices; analyze, via a corresponding HDT application of the plurality of HDT microservices, each patient-specific data file from the plurality of patient-specific data files to: identify patient-specific data files from the plurality of patient-specific data files including at least one patient-specific echocardiogram data record for generating a plurality of identified patient-specific data files respectively associated with a plurality of identified patients, or ignore the patient-specific data files without the at least one patient-specific echocardiogram data record; generate for each of the plurality of identified patient-specific data files, a patient-specific tokenized diagnostic feature set using a feature-space transformation software module applied to at least one patient-specific diagnostic text; where the at least one patient-specific diagnostic text in each of the plurality of identified patient-specific data files with text associated with: the at least one patient-specific echocardiogram data record of the patient, the at least one patient-specific data record of the patient, or any combination thereof, where the patient-specific tokenized diagnostic feature set may include at least one text tokenized feature of the at least one patient-specific diagnostic text based on a feature-space transformation of each word, a phrase of words, or both in the at least one patient-specific diagnostic text; generate a heart disease (HD) severity score from an output of at least one trained HD severity determination machine learning model based on inputting the patient-specific tokenized diagnostic feature set for each of the plurality of identified patients into the at least one trained HD severity determination machine learning model; output a triage score from a triage scoring algorithm for each of the plurality of identified patients based at least in part on: the HD severity score, and a provider-visit weight based on the at least one date of the at least one visit to the at least one provider; generate a triage-score patient severity list ranked from a highest triage score to a lowest triage score, for each identified patient associated with each identified patient-specific data file from the plurality of identified patient-specific data files; where the triage-score patient severity list may indicate a set of the plurality of identified patients that should first receive urgent care; and transmit, via the API layer, at least one displaying instruction, to at least one specific backend computing devices from the plurality of backend computing devices associated with at least one specific provider from the plurality of providers that provided cardiac medical care to any of the plurality of identified patients in the set, that causes to display on a graphical user interface (GUI) on at least one display of the specific backend computing devices: the triage-score patient severity list, an urgent medical care alert for each identified patient in the set, or both.

In some embodiments, the present disclosure provides an exemplary technically improved computer-based system that may include a scalable data container orchestration platform, including at least one processing device of a plurality of computing devices that operate a plurality of heart disease triage (HDT) microservices; and at least one load balancer. The scalable data container orchestration platform configured to dynamically scale a number of computing devices based on data traffic assessed by the at least one load balancer for the plurality of HDT microservices to maximize computational and load efficiencies in the plurality of computing devices, interact with a plurality of backend computing devices associated with a plurality of providers through an application programming interface (API) layer comprising a plurality of APIs, and relay data associated with a plurality of patients between any of the plurality of backend computing devices and the plurality of HDT microservices. The scalable data container orchestration platform may be programmed to continuously receive over a communication network, from a plurality of electronic resources, a plurality of patient-specific data files associated with the plurality of patients; where each of the plurality of patient-specific data files may include at least one patient-specific data record associated with a patient from the plurality of patients; where the at least one patient-specific data record may include: a medical history record of the patient, and at least one date of at least one visit to at least one provider that provided cardiac medical care to the patient; assign each patient-specific data file from the plurality of patient-specific data files to any of the plurality of HDT microservices based on scaling of the number of computing devices; analyze, via a corresponding HDT application of the plurality of HDT microservices, each patient-specific data file from the plurality of patient-specific data files to: identify patient-specific data files from the plurality of patient-specific data files comprising at least one patient-specific echocardiogram data record for generating a plurality of identified patient-specific data files respectively associated with a plurality of identified patients, or ignore the patient-specific data files without the at least one patient-specific echocardiogram data record; generate for each of the plurality of identified patient-specific data files, a patient-specific tokenized diagnostic feature set using a feature-space transformation software module applied to at least one patient-specific diagnostic text; where the at least one patient-specific diagnostic text in each of the plurality of identified patient-specific data files with text associated with: the at least one patient-specific echocardiogram data record of the patient, the at least one patient-specific data record of the patient, or any combination thereof, where the patient-specific tokenized diagnostic feature set may include at least one text tokenized feature of the at least one patient-specific diagnostic text based on a feature-space transformation of each word, a phrase of words, or both in the at least one patient-specific diagnostic text; generate a heart disease (HD) severity score from an output of at least one trained HD severity determination machine learning model based on inputting the patient-specific tokenized diagnostic feature set for each of the plurality of identified patients into the at least one trained HD severity determination machine learning model; output a triage score from a triage scoring algorithm for each of the plurality of identified patients based at least in part on: the HD severity score, and a provider-visit weight based on the at least one date of the at least one visit to the at least one provider; generate a triage-score patient severity list ranked from a highest triage score to a lowest triage score, for each identified patient associated with each identified patient-specific data file from the plurality of identified patient-specific data files; where the triage-score patient severity list may indicate a set of the plurality of identified patients that should first receive urgent care; and transmit, via the API layer, at least one displaying instruction, to at least one specific backend computing devices from the plurality of backend computing devices associated with at least one specific provider from the plurality of providers that provided cardiac medical care to any of the plurality of identified patients in the set, that causes to display on a graphical user interface (GUI) on at least one display of the specific backend computing devices: the triage-score patient severity list, an urgent medical care alert for each identified patient in the set, or both.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 1-10 show one or more schematic flow diagrams, certain computer-based architectures, and/or screenshots of various specialized graphical user interfaces which are illustrative of some exemplary aspects of at least some embodiments of the present disclosure.

DETAILED DESCRIPTION

Figure 1:
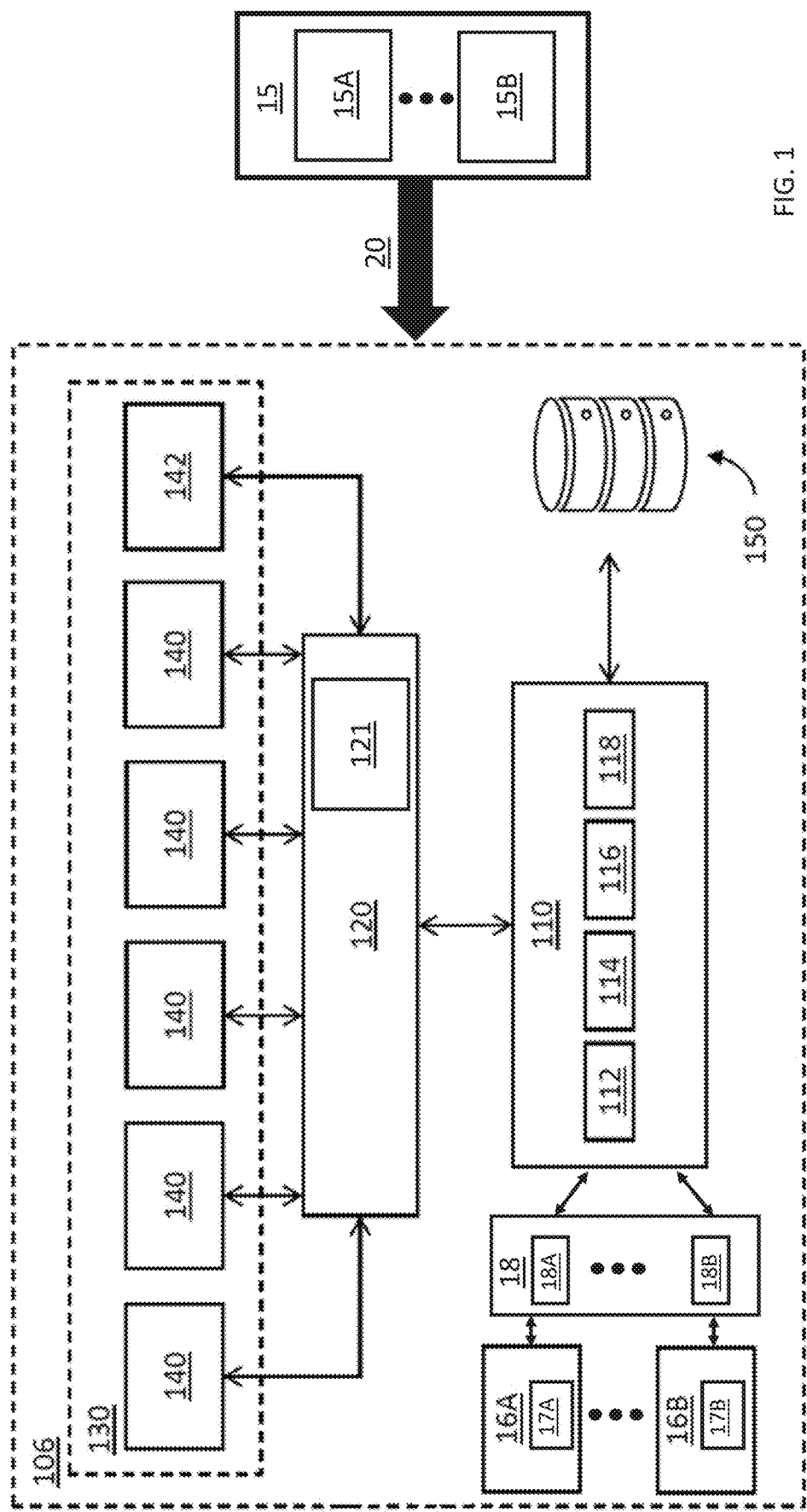

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Heart disease is the leading cause of death in the United States with an annual cost burden of $219B. Congenital Heart Disease (CHD) is the most common form of birth defect affecting 1:100 births with 40,000 new diagnoses annually. CHD exhibits a wide spectrum of disease severity ranging from small "holes in the heart" that may close without intervention to more complicated malformations requiring multiple surgeries in the first year of life. Structural and congenital heart disease may represent two common subtypes of heart disease that may be effectively managed for decades provided that the necessary surveillance, preventive measures, and interventions may take place. Conversely, failure to effectively monitor patients with these conditions may lead to inevitable decompensation, unnecessary readmission, and preventable morbidity and mortality. Regardless of where in the spectrum a given patient lies, optimal outcomes require lifelong surveillance with repeat imaging, clinic visits, and concomitant interventions.

Traditional electronic medical records may house petabytes of clinical information data that may be organized it in an encounter-centric, transactional format with limited ability to visualize time series data and no tools for population level assessment. This format may create clinical blind spots and obscures gaps in care which may lead to catastrophic preventable morbidity and mortality.

A subgroup analysis of 1350 patients or roughly 5% of those with known CHD in the Northwell system demonstrated over 90 significant gaps in care. Extrapolation to the total Northwell CHD population highlights the scope of the problem with over 100 missed interventions (each with an average hospital contribution margin of $25 k), several 100 missed imaging studies, and hundreds of patients lost to follow-up or out-migrating to competing systems.

These shortcomings may contribute to ongoing gaps in care across a wide spectrum of chronic diseases. A variety of vendors may have attempted to address these shortcomings through the creation of registries and dashboards requiring varying degrees of integration, customization, and logistical support. However, none of these solutions provided a comprehensive end to end platform capable of supporting clinician, patient, and CRM-facing applications.

Embodiments of the present disclosure herein describe a Cardiovascular Care Platform (CVCP) that may identify and close unaddressed care gaps with minimal disruption of existing workflows. The CVCP may provide a software tool for immediate improvement in outcomes, revenue capture, and patient satisfaction. The CVCP may implement algorithms that combine disease severity information with social determinants of health to highlight vulnerable cohorts within the larger population and may target outreach where it is needed most. Intuitive user interfaces (UIs) (e.g., graphical user interfaces) may be tailored for provider, patient, and customer relationship management (CRM)-facing applications that may transition seamlessly from patient to population-level detail spanning the inpatient and outpatient domains. Relevant clinical data may be normalized, discretized, and condensed by natural language processing (NLP) tools that may facilitate the application of machine learning to clinical decision support and outcome prediction. The CVCP's modular design may allow for a user-selected focus on specific subpopulations within the cardiovascular disease space and may facilitate future expansion into additional markets.

In some embodiments, the Cardiovascular Care Platform (CVCP) may be configured to solve a number of problems seen in recurring care gaps in congenital heart disease care that was first observed at several institutions (NYU, Columbia, Children's Hospital Los Angeles, Loma Linda University, and Northwell) such as for example, conflicting diagnoses within electronic medical records (EMR), an overreliance on retrospective databases and registries that were poorly integrated into clinical workflows, and/or a lack of a prospective means of identifying and tracking congenital heart disease (CHD) patients in real time. In addition, the standard format of encounter-centric data presentation may be inadequate for visualizing and managing time-dependent and population level trends that the CVCP may solve.

Attempts to solving these problems started at Loma Linda University Medical Center that relied on querying the problem list and ICD-10 codes within a medical record software platform such as Epic, for example to identify potential patients with congenital heart disease. An EMR pop-up window may prompt the end user (cardiologist or surgeon at the point of care) to confirm the presence of congenital heart disease (CHD) and allow a limited set of high-yield diagnostic information to be entered into the EMR. The aggregate population data may be visualized and filtered using a visual analytics platform such as Tableau, for example. An attempt to incorporate the visit history and identify patients lost to follow-up was partially developed as a second Tableau dashboard but was never deployed. To solve these problems from Epic and Tableau, the CVCP may be configured to incorporate machine learning and AI capabilities.

Embodiments of the present disclosure herein describe a Cardiovascular Care Platform (CVCP) that may be used to continuously monitor patient data from a plurality of patients. Patients may be identified with potential heart disease based on patient-specific diagnostic text appearing in the patient's medical records, echocardiogram data, or both. Word and/or phrases of words in the patient-specific diagnostic text may be tokenized using a feature-space transformation to generate a patient-specific tokenized feature set for the identified patients. The patient-specific tokenized feature set may be input into a trained heart disease (HD) severity score determination machine learning model to determine a HD severity score for each patient. A triage score may be determined from the HD severity score for each patient and a provider-visit weight. The triage score for patients identified with potential heart disease may be used to generate a triage-score patient severity list ranked from a highest triage score to a lowest triage score to indicate to a provider as to which patient should receive care first.

Stated differently, the embodiments herein further describe an improved cardiac care platform whereby a trained machine learning model may be used to process echo cardiogram data in real time for assessing the presence of CHD and/or other cardiovascular diseases in a plurality of patients. The CVCP may monitor the plurality of patients away from controlled environments such as hospital beds or treatment facilities. The MLM and associated algorithms automatically identify possible CHD patients and assign a medical severity score, which may be used in a triage algorithm to identify patients within the plurality of patients most at risk for CHD and associated complications. Thus, the embodiments described herein are a specific method for improving cardiac monitoring technologies.

FIG. 1 is a block diagram of a computer-based system of a scalable orchestration platform for implementing the Cardiovascular Care Platform (CVCP) 106 in accordance with one or more embodiments of the present disclosure. Aspects of the present disclosure may be applied to any embodiment for the orchestration of microservices for implementing the CVCP via a graphical user interface (GUI).

In some embodiments, the CVCP 106 may include a multi-layered architecture including, for example, a service layer 130, an orchestrator 120 and a platform layer 110, however other layers are additionally contemplated. In some embodiments, a plurality of users such as physicians, health care providers, etc may interact with the CVCP 106 via any of N user devices denoted 16A and 16B, where N is an integer. Each of the N user devices may include displays that respectively may display N graphic user interfaces denoted 17A and 17B. Communications from the user devices 16A and 16B may be received by the platform layer 110 via an application programming interface (API) layer 18 that may respectively include a plurality of M APIs denoted 18A and 18B, where M is an integer.

In some embodiments, the platform layer 110 may include an input/output (I/O) interface 112 for facilitating data communication to external devices, such as, e.g., the transceiver 108, at least one database 150, among other devices. The platform layer 110 may also include a runtime environment 114 for implementing programs, services, functionalities and microservices using a plurality of computing devices 116, each with a respective plurality of processing devices, and using a plurality of memory devices 118 for implementing the CVCP software tool. The usage of the plurality of memory devices 118 may include, e.g., temporary storage and caching of data to facilitate resources of the CVCP 106.

In some embodiments, the platform layer 110 may include functionality for, e.g., configuration management, logging and monitoring of data traffic (e.g., via at least one load balancer 121, document management, communication routing, notifications, messaging tools, reporting tools, as well as any other functions pertaining to platform level functionality.

In some embodiments, a request from any of the user devices 16A and 16B may be routed to the orchestrator 120. In an embodiment, the orchestrator 120 manages operations of the CVCP 106, including allocation of resources, process schedule with, e.g., the processing devices 116, among other tasks. For example, in some embodiments, the orchestrator 120 may include application programming interfaces (APIs) for calling services and functions of the CVCP 106 in interacting with the user devices 16A and 16B.

In some embodiments, the CVCP 106 may be a scalable orchestration platform. The orchestrator 120 may include the at least one load balancer 121 that may dynamically scale a number of computing devices 116 based on data traffic assessed by the at least one load balancer 121 so as to maximize computational and load efficiencies in the plurality of computing devices 116 that may process up to petabytes of patient data including medical image data.

In some embodiments, the orchestrator 120 may manage operations of microservices in a service layer 130 and coordination of the service layer 130 with the platform layer 110. For example, the service layer 130 may include microservices 140 related to, for example, for implementing the CVCP. In some embodiments, the orchestrator 120 may facilitate aggregation of data from multiple domains in the service layer 130 and/or orchestrates data-related operations across domains and services to provide for complete experiences within any given domain.

In some embodiments, the service layer 130 may also include shared microservices 142 that include functionality that may be shared across multiple domains. Therefore, in some embodiments, the orchestrator 120 may manage the data flow and the execution of microservices such that data may be shared, processed, and returned to any of the N user devices 16A and 16B. For example, a user device such as the user device 16A may communicate a request, e.g., a user interaction via a GUI of the user device 16A. The request may be received by the transceiver 108 and routed via the platform layer 110 to the orchestrator 120.

In some embodiments, any of the N user devices 16A and 16B may be associated with health care provider (e.g., doctor, surgeon, health care staff, and the like) to receive individual patient data, and/or patient data from plurality of patients, and/or summary data from the plurality of patients such as for example but not limited to a triage-score patient severity list (indicating which patients should first receive urgent medical care).

In some embodiments, a plurality of P electronic resources 15 denoted as 15A and 15B, where P is an integer, may be configured to provide 20 the Cardiovascular Care Platform (CVCP) 106 with a plurality of patient-specific data files stored in the plurality of electronic resources 15 that may be associated with a plurality of patients. The CVCP 106 may be communicatively coupled to the plurality of P electronic resources 15 through a communication network (not shown).

In some embodiments, the plurality of P electronic resources may provide 20 plurality of patient-specific data files by continuously streaming patient data (e.g., data firehosing) to the CVCP 106.

In some embodiments, each of the plurality of electronic resources 15 may each include at least one electronic resource controller (not shown). The CVCP 10 may transmit a data query API call with a data request to each of the plurality of electronic resources 15, which may program the at least one electronic resource controller to implement a search for a particular data record based on the data request and to automatically transmit the identified data record, based on the data request, back to the CVCP 106.

In some embodiments, the plurality of P electronic resources 15 may be store a plurality of patient-specific data files, that are respectively associated with a plurality of patients, formatted in a Fast Healthcare Interoperability Resources (FHIR) format. In other embodiments, the plurality of P electronic resources 15 may be a Google Cloud Platform (GCP) FHIR data repository.

Figure 2:
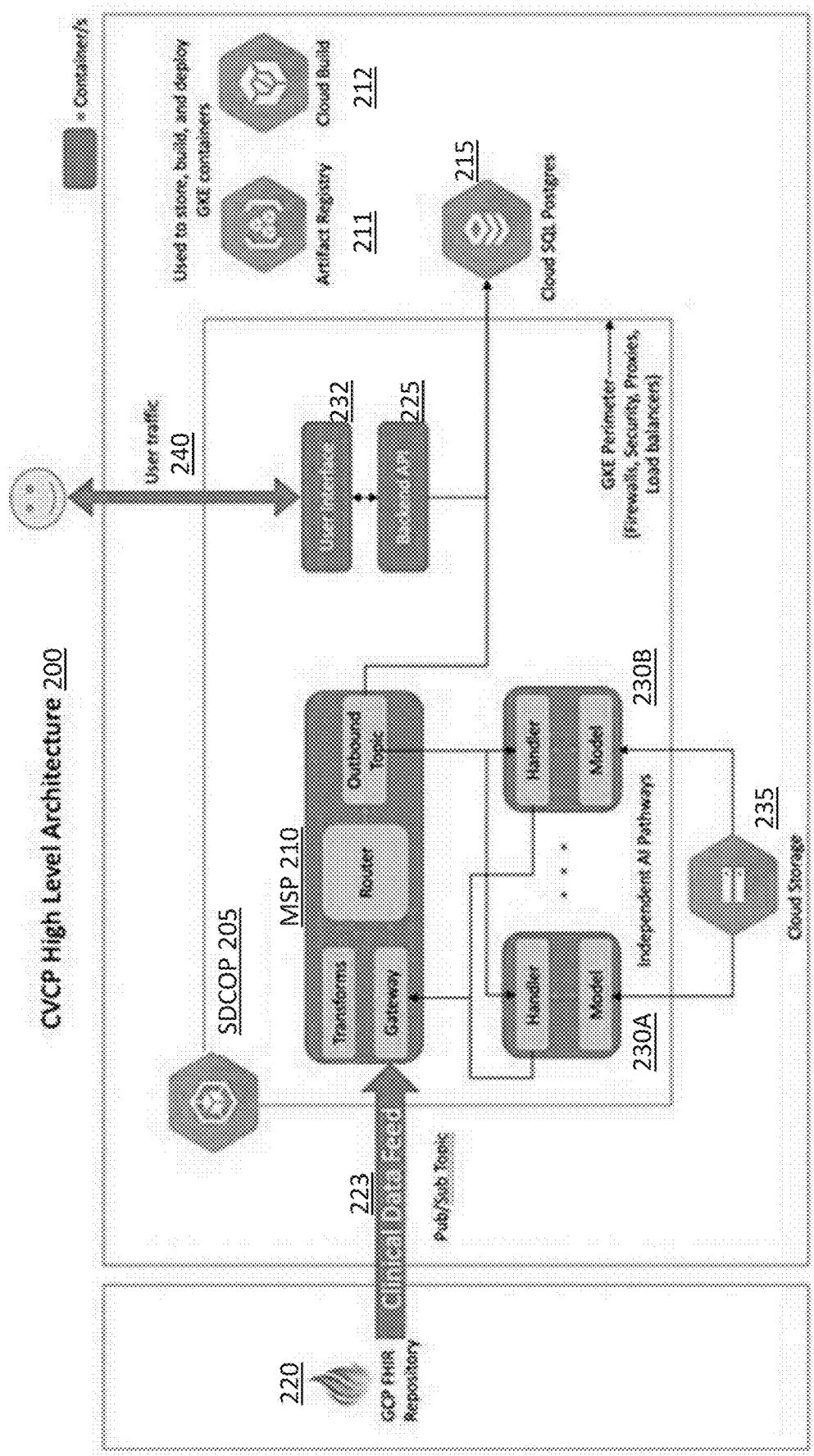

FIG. 2 is a block diagram of scalable data container orchestration platform (SDCOP) 205 implementing a CVCP high level architecture 200 in accordance with one or more embodiments of the present disclosure. The CVCP high level architecture 200 may be implemented by the scalable orchestration platform 106 shown in FIG. 1. The CVCP high level architecture 200 may be implemented, for example, using Kubernetes. Kubernetes is a scalable data container orchestration platform that include internal load balancing functionality and/or use external load balancing functionality. The Kubernetes load balancing functionality may include for example, round robin and/or random distribution methods for load management.

In some embodiments, the SDCOP 205 may be include an messaging and streaming platform (MSP) 210, a plurality of Q handler/module modules denoted 230A . . . 230B, where Q is an integer, a backend API 225, a user interface 232 to relay data between the platform 205 and the any of N user devices denoted 16A and 16B associated with health provider (e.g., doctors) and/or patients. The MSP 210 may be implemented by Apache Pulsar, for example. The SDCOP 205 may be coupled to a cloud storage 235 (e.g., Google cloud storage) and the Google Cloud Platform (GCP) FHIR data repository 220 via the clinical data feed 223. The SDCOP 205 may relay data to a Postgres SQL service 215 such as for example, a PostgreSQL service offered by Google Cloud Platform. The PostgreSQL service 215 may provide database services. In addition, for Google Kubernetes (GKE) containers, an artifact registry 211 may be a secure storage location for container images that may be integrated with cloud build 212 for creating and/or managing automated data build pipelines.

In some embodiments, the MSP 210 may be an open-source platform for messaging and streaming. The messaging functionality may provide information and/or data to different components in the system. The streaming functionality may process continuous flow of data, such as for example, to continuously receive and manage a plurality of patient-specific data files associated with a plurality of patients that may be stored in the plurality of electronic resources 15 as in FIG. 1 or in the exemplary embodiment shown in FIG. 2, a Google Cloud platform (GCP) FHIR data repository. A clinical data feed 223 may provide the plurality of patient-specific data files associated with a plurality of patients to the SDCOP 205 using Google Cloud Pub/Sub (Publish/Subscribe) messaging service by GCP.

In some embodiments, the MSP 210 may include sub-modules such as for example, a transforms module, a gateway module, a router module, and an outbound topic module. The transforms module may sample messages processed by the Pulsar pipeline. The gateway module may act be a bridge between Pulsar and any other systems by enabling communication between Pulsar and other systems that are not formatted to communicate with Pulsar. The router module may route messages based on defined rules to determine which messages to which topics based on message content, properties, or other factors. The outbound topic module may route messages from Pulsar to any external systems and may work with the gateway module to establish a connection and destination specification for messages leaving Pulsar. The outbound topic may store raw data from the FHIR repository a cloud database 150.

In some embodiments, each of a plurality of handler/model modules denoted 230A . . . 230B may include at least one handler and at least one model. The model may include a trained machine learning module that may be configured to receive patient-specific data that may include medical image data such as echocardiogram data, computerized tomography (CT) data, Magnetic resonance imaging (MRI) data, and the like, for input into the trained machine learning model so as to output a diagnostic prognosis severity score indicative of a likelihood and severity that a patient suffers from a particular disease.

In some embodiments, the handlers may manage data transformations and/or data transfer between different systems and/or data formats. In other embodiments, the handlers may provide for data stream management. The handler may subscribe to specific pieces of information.

In some embodiments, the system architecture may be built in such a way that there may be multiple models and multiple handlers that are acting independently to perform AI tasks for the application. For example, there may be a handler that may be sampling echocardiogram reports streamed into the system via the clinical data feed. It may then pass those through the model which also lives inside of this cluster. The model may be stored in Google Cloud storage 235 and/or 335. The model in module 230A . . . 230B for example may inform the handler of its prediction and then the handler may publish an FHIR-formated observation that may be re-ingested into the database. The models may basically perform as independent observers sampling streams of data passing through into the database such as to identify patient data records with an echocardiogram report.

In some embodiments, the SDCOP 205 may search the patient-specific data entering the platform from the clinical data feed for specific data attributes (e.g., outbound topic) such as an echocardiogram or medical data indicative of heart disease and the handler/model is sampling the data as the subscriber in the pub/sub paradigm.

In some embodiments, the handlers may be independent and open a subscription on the outbound topic to sample the streaming patient-specific data from the FHIR repository. The subscription may include filtering criteria the system may receive the desired data in the Pub/Sub subscription based on the filtering criteria. Stated differently, the handler may sample the data to identify the topic, pulls in the identified data, calls the model, and gets the response from the model. The response may be wrapped into an FHIR observation (e.g,. FHIR format) and then publishes the response.

In some embodiments, MSP 210 may facilitate logic to be embedded in the Pub/Sub architecture defined rule sets to control what data gets routed to what topic (e.g., the router). The rules may be used in sampling the data and to determine what outbound topics are going to be routed as each of the FHIR resources get consumed independently and pushed into the database.

In some embodiments, the gateway in the MSP 210 has different topics that may be published that may include different types of data. The patient data may be HL7, FHIR, and/or some arbitrary XML.

In some embodiments, the streaming patient data over the clinical data feed may have different attributes may be used to determine whether or not the patient has CHD using machine learning. Once the machine learning models determine that a patient may have CHD, an observation, which is an attribute for that patient, may be pushed back by the handlers into the gateway associated with that patient.

In some embodiments, via the user interface 232 and the backend APIs 225, the system may communicate with the database to pull information that can be surfaced to the user (e.g., the doctor, for example, who may then confirm or reject that heart disease prediction.

Figure 3:
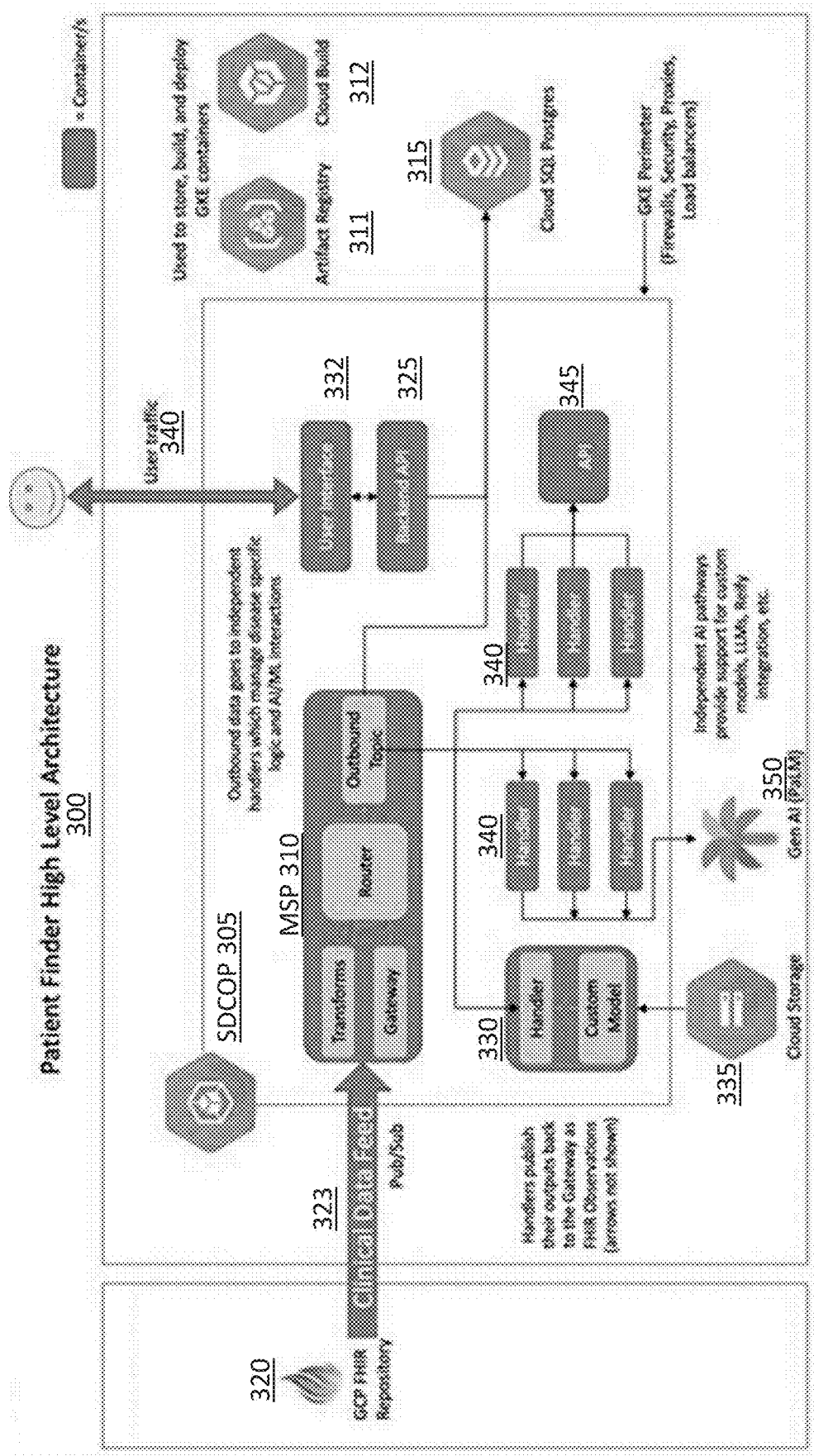

FIG. 3 is a block diagram of scalable data container orchestration platform (SDCOP) 305 implementing a patient-finder high level architecture 300 in accordance with one or more embodiments of the present disclosure. The CVCP high level architecture 300 may be implemented by the scalable orchestration platform 106 shown in FIG. 1. The CVCP high level architecture 300 may be implemented, for example, using Kubernetes with load balancing functionality.

In some embodiments, the SDCOP 305 may be include an messaging and streaming (MSP) 310, a plurality of Q handler/module modules denoted 330, a plurality of handlers 340, a Second API 345, a backend API 225, a user interface 232 to relay data between the SDCOP 205 and the any of N user devices denoted 16A and 16B associated with health provider (e.g., doctors) and/or patients. The second API 345 may be another API to another data source. The MSP 310 may be implemented by Apache Pulsar, for example. The SDCOP 305 may be coupled to a cloud storage 335 (e.g., Google cloud storage) and the Google Cloud Platform (GCP) FHIR data repository 320 via the clinical data feed 323. The SDCOP 205 may relay data to a Postgres SQL service 315 such as for example, a PostgreSQL service offered by Google Cloud Platform. The PostgreSQL service 315 may provide database services. In addition, for Google Kubernetes (GKE) containers, an artifact registry 311 may be a secure storage location for container images that may be integrated with cloud build 312 for creating and/or managing automated data build pipelines. The platform may relay data from a plurality of handlers 340 to a Google Gen AI (PaLM) module 350, which may be a functional unit that may provide specific capabilities related to PaLM (Pathway Language Model) technology. The PaLM technology may be used for generative text tasks. These tasks may include processing of the diagnostic texts associated with the patient-specific data records and/or diagnostic text of diagnoses associated with the medical image data.

In some embodiments, the MSP 310 may be an open-source platform for messaging and streaming similarly as described in FIG. 2. A clinical data feed 323 may provide the plurality of patient-specific data files associated with a plurality of patients to the SDCOP 305 using Google Cloud Pub/Sub (Publish/Subscribe) messaging service by GCP.

In some embodiments, the MSP 310 may include sub-modules such as for example, a transforms module, a gateway module, a router module, and an outbound topic module as previously described hereinabove in FIG. 2. The embodiments shown in FIG. 3 may be used for identifying patients (patient finder) from a plurality of patient suspected of suffering from diseases such as heart diseases for example. In other embodiments, the patient finder system of FIG. 3 may be used to generate a triage list of patients to identify which patients from the plurality of patient may first require urgent care based on a triage score that will be described hereinbelow.

In some embodiments, the software code implementing the MSP 210 and 310 as well as the handler/model modules 230A . . . 230B and 330 as shown in FIGS. 2 and 3 may implement a plurality of heart disease triage (HDT) microservices (e.g., microservices 140 on FIG. 1) operating on the scalable data container orchestration platform such as Kubernetes.

Figure 4:
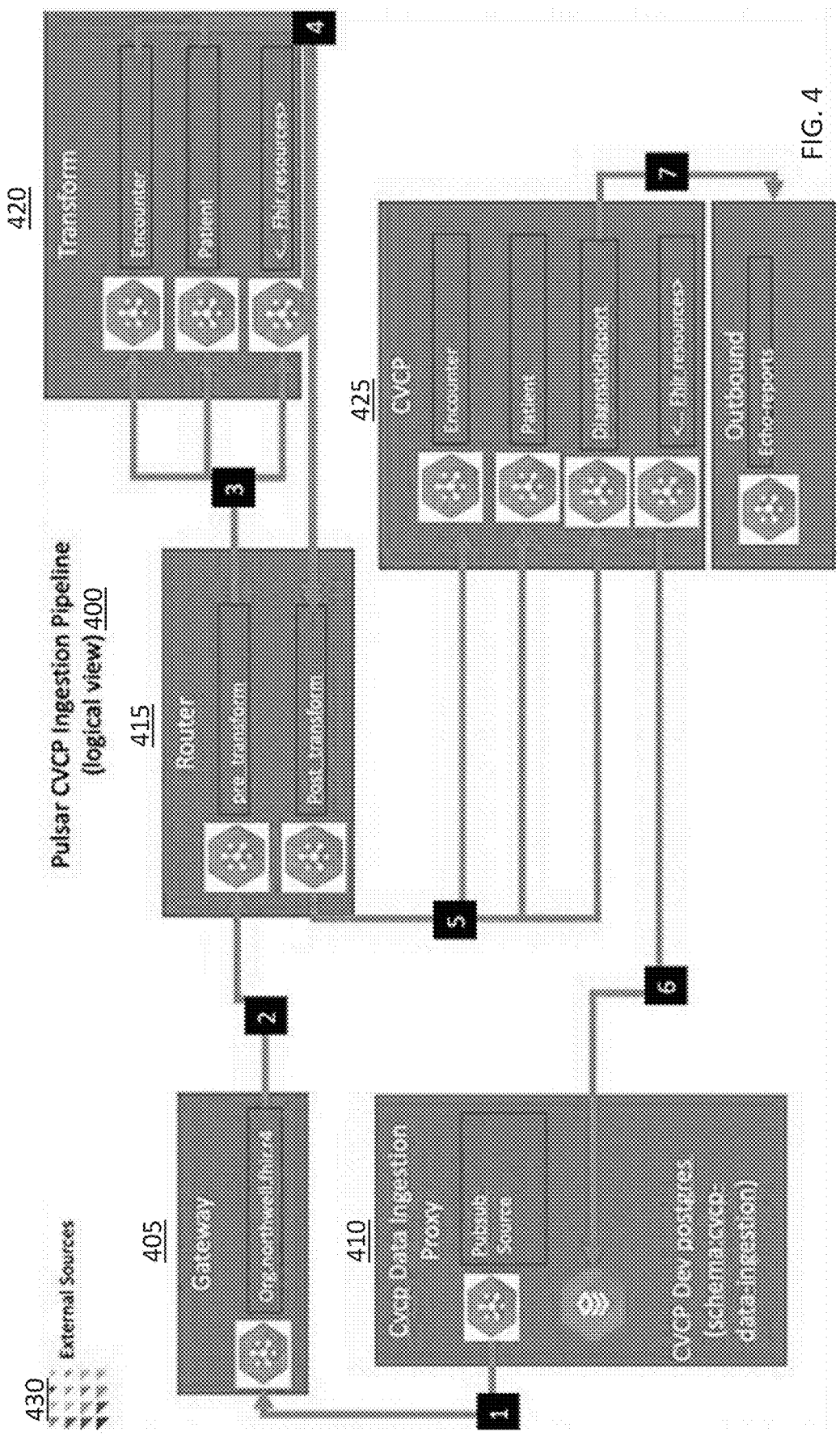

FIG. 4 is a logical view of a CVCP Pulsar ingestion pipeline 400 in accordance with one or more embodiments of the present disclosure. The CVCP Pulsar ingestion pipeline 400 may be implement by the MSP 210 in FIG. 2 and the MSP 310 of FIG. 3. Patient-specific data from external data sources 430 such as for example, the GCP FHIR Repository in FIGS. 2 and 3 may be relayed to a via a clinical data feed to both the CVCP Data ingestion proxy 410 implement a Pub/Sub messaging service and a Gateway 405. The Gateway 405 may relay the data to a router 415 implementing a pre transform function in a transform block 420 and a post transform function applied to the messages exiting the transform block 420. The transform block 420 may analyze the patient-specific data searching patient specific data records for encounter data (e.g., patient provider encounter) and patient-specific data applying FHIR formatting resources. The data (messages) may be applied to the CVCP 425 to further analyze the data so as to identify and/or output echo-reports in the patient-specific data.

Figure 5:
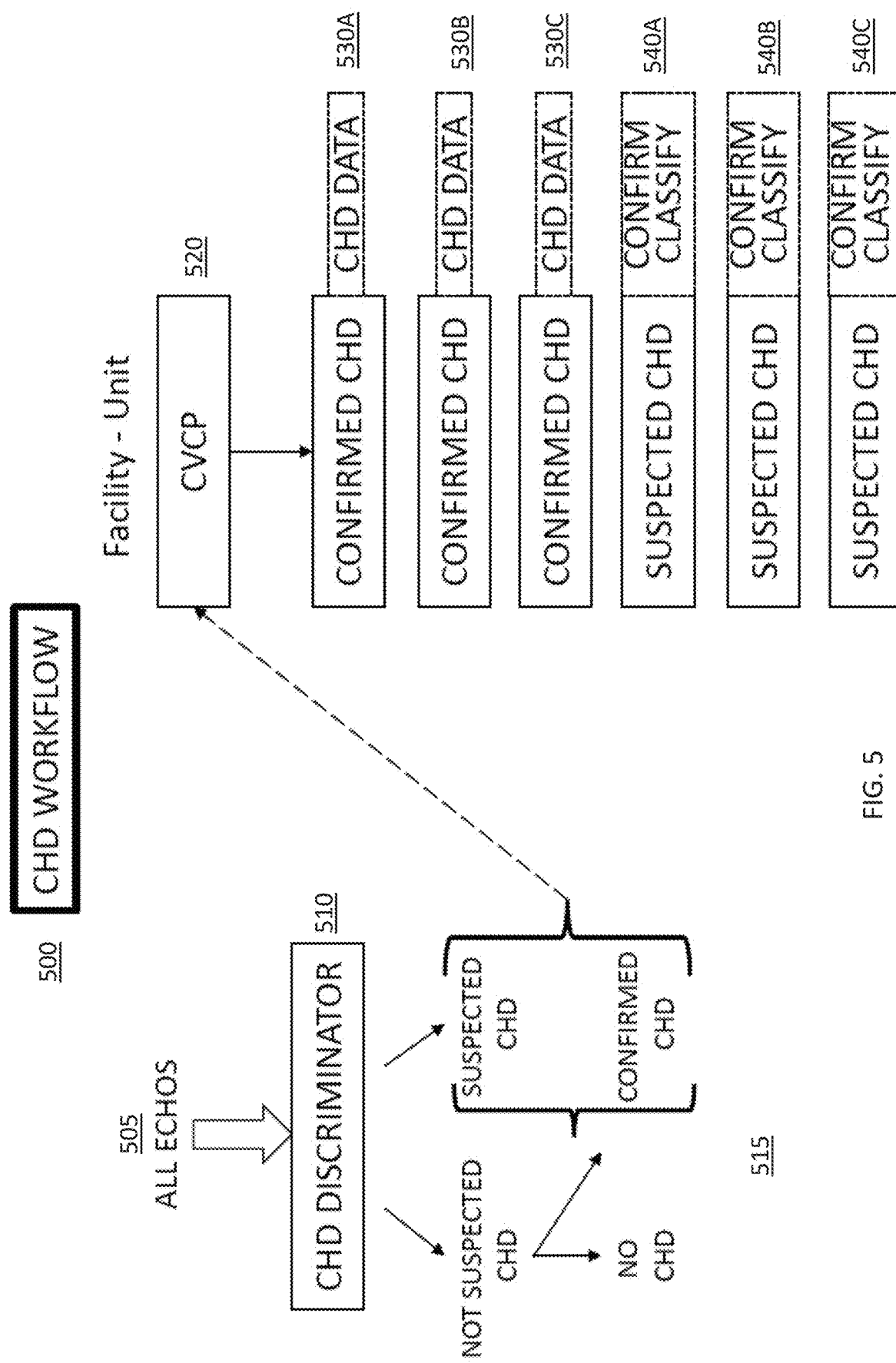

FIG. 5 is a workflow diagram 500 for identifying patients suspected of suffering from congenital heart disease (CHD) in accordance with one or more embodiments of the present disclosure. A CVCP platform 520 may be configured to analyze all echocardiogram data 505 from a plurality of patients. The echocardiogram data which may include the diagnostic text accompanying each echocardiogram may be applied to a machine learning model also known as a CHD discriminator trained to identify a CHD predicted diagnosis 515 such as for example no CHD, CHD is not suspected, CHD is suspected, and/or CHD is confirmed. The CVCP platform 520 may be configured to output for a plurality of patients, a list of patients with in a first set of patients with confirmed CHD and accompanying CHD data, denoted 530A . . . 530C, and/or in a second set of patients with suspected CHD and a flag to the provider to confirm CHD prediction, denoted 540A . . . 540C.

Although the workflow diagram relates to CHD, this is by way of conceptual clarity and not by way of limitation of the embodiments described herein. Any disease may be determined in this manner using patient-specific data and medical image data that are input into a machine learning model specifically trained to identify a severity level of a disease in a given patient.

In some embodiments, the machine learning model may be trained to output a severity score to quantify a level of the likelihood of a patient have a particular disease or medical condition such as for example, heart disease. A severity score may be on a scale from 0 to 10, for example where a severity score of 0 indicates that the patient is free from the disease or medical condition, and a 10 is where the patient suffers from the disease or medical. Between 0 and 10, the patient may have a particular disease or medical condition with increasing likelihood from 0-10.

In some embodiments, the machine learning model may be trained to output the severity score based on a textual analysis of both the patient-specific data file (e.g., medical history, hospital visits, doctor visits, prescribed medication, etc) and the diagnostic text accompanying a medical imaging file such as an echocardiogram.

In some embodiments, the machine learning model may be trained to output a disease prediction and/or an anatomical defect prediction and/or a severity score based on an analysis of the image data (pixel data analysis) of the medical image data such as an analysis of the echocardiogram image data, for example.

In some embodiments, the scalable orchestration module 106 may be configured to generate a patient-specific tokenized diagnostic feature set for each of the plurality of patient-specific data files using a feature-space transformation software module applied to at least one patient-specific diagnostic text. The at least one patient-specific diagnostic text in each of the plurality of identified patient-specific data files with text associated with: the at least one patient-specific medical image data record of the patient, the at least one patient-specific data record of the patient, or any combination thereof.

In some embodiments, the scalable orchestration module 106 may perform a feature-space transformation of each word, a phrase of words, or both in the at least one patient-specific diagnostic text and/or the at least one patient-specific medical image data record of the patient with the patient diagnosis based on the medical image data.

In some embodiments, in the case of suspect heart disease, the medical image data may include an echocardiogram text report accompanying an echocardiogram data record.

In some embodiments, at least one HD severity determination machine learning model may be trained to output a heart disease (HD) severity score based on inputting the patient-specific tokenized diagnostic feature set for each of the plurality of identified patients into the at least one HD severity determination machine learning model.

In some embodiments, the tokenized diagnostic feature set may be determined using Word2vec, a technique used in natural language processing (NLP) that may represent words as numerical vectors. The numerical vectors may capture the semantic meaning and relationships between words. Word2vec may transform words into numbers reflecting how similar their meanings are.

In some embodiments, for cardiac patients, for example, patient-specific data may include an echocardiogram data where the patient specific data and/or the echocardiogram data may be input into at least one heart disease severity score machine learning model that may be trained to output a heart disease (HD) severity score indicative of at least one predicted HD diagnosis that may include a normal heart diagnosis, or at least one of: a congenital heart disease (CHD) diagnosis, a structural heart disease (SHD) diagnosis, a congestive heart failure (CHF) diagnosis, a coronary artery disease (CAD) diagnosis, or a peripheral vascular disease (PVD) diagnosis.

Figure 6:
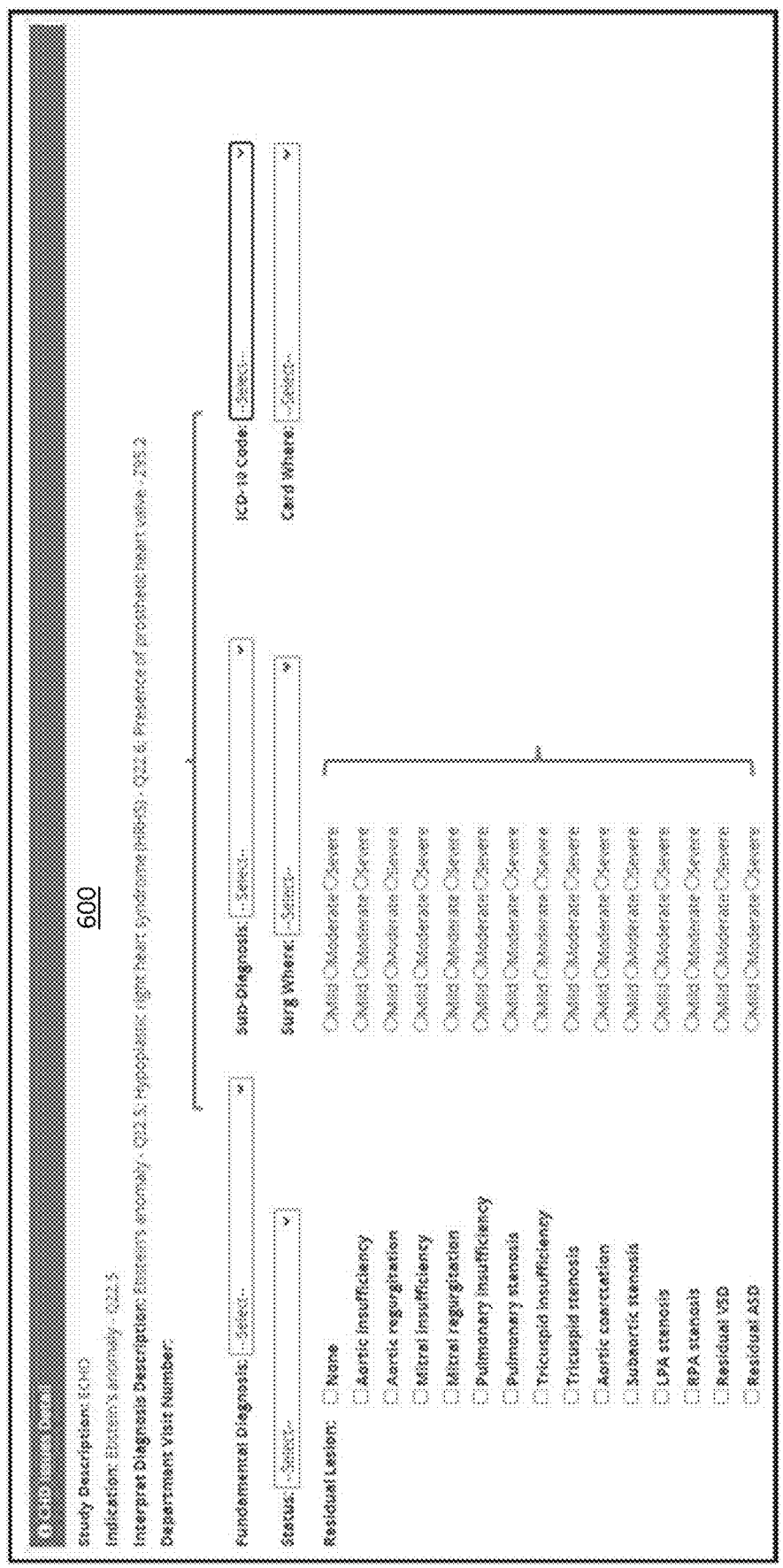

FIG. 6 is a CHD Issues screenshot 600 displayed on a graphic user interface (GUI) 17A . . . 17B of the CVCP system in accordance with one or more embodiments of the present disclosure. The CVCP may utilize ListApp to identify and diagnose CHD patients within a Syngo database (e.g., from Northwell) as well as present the data via powerBI (Microsoft data visualization package). Although the initial version of the CVCP identified the expected care gaps and allowed for a granular quantification of the corresponding revenue lost, a more robust CVCP version was further implemented to allow for efficient, prospective identification and diagnosis of CHD as well as to provide a platform for targeted outreach.

Figure 7:
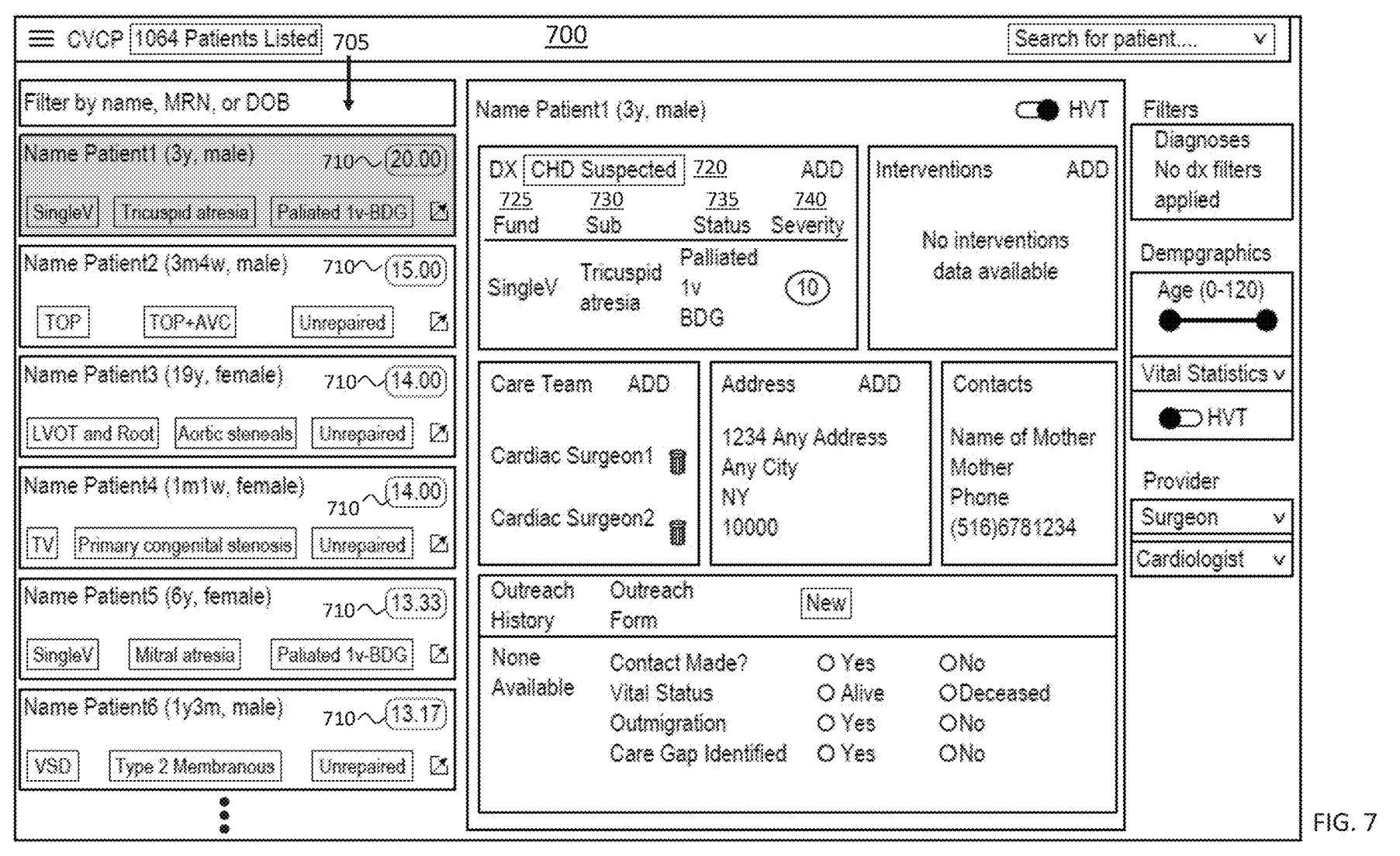

FIG. 7 is a first exemplary screenshot 700 of a CVCP output on graphical user interface (GUI) of a ranked triage-score patient severity list 705 in accordance with one or more embodiments of the present disclosure. The CVCP platform 106 executing the patient finder system 300 as shown in FIG. 3 may identify an identified patient set of the plurality of patients with a patent-specific data records that include a medical image and associated diagnosis indicative of a particular disease. For example, in the case of cardiac patients, the patient-specific data record may include an echocardiogram and may include a particular patient in the identified patient set upon identifying an echocardiogram report on the medical data record of the particular patient.

In some embodiments, the CVCP platform 106 may use the severity score outputted from the machine learning model (e.g., the heart disease machine learning model) to compute a triage score 710 for each of the patient in the identified patient set. The CVCP platform 106 may rank the patients in the ranked triage-score patient severity list 705 based on the triage score 710 from highest to lowest triage score.

In some embodiments, the CVCP platform 106 may transmit, via the API layer 18, at least one displaying instruction, to at least one specific backend computing devices from the plurality of backend computing devices 16A . . . 16B associated with at least one specific provider from the plurality of providers that provided cardiac medical care to any of the plurality of identified patients in the identified patient set, that causes to display on a graphical user interface (GUI) 17A . . . 17B on at least one display of the specific backend computing devices: the triage-score patient severity list 705, an urgent medical care alert for each identified patient in the set, or both.

In some embodiments, the GUI 17A . . . 17B may be configured to allow the user to select a particular patient in the identified patient list which may open a patient-specific information card with all of the current medical data of the patient as shown for "Name Patient 1", a 3 year old male. A diagnosis DX 720 for Patient1 may indicate that the machine learning model may predict a severity score 740 of 10 based on a FIND 725, SUB 730, and STATUS 735 parameter for each type of heart dysfunction type observed in the echocardiogram for generating a feature set for input into the machine learning model.

Figure 8:
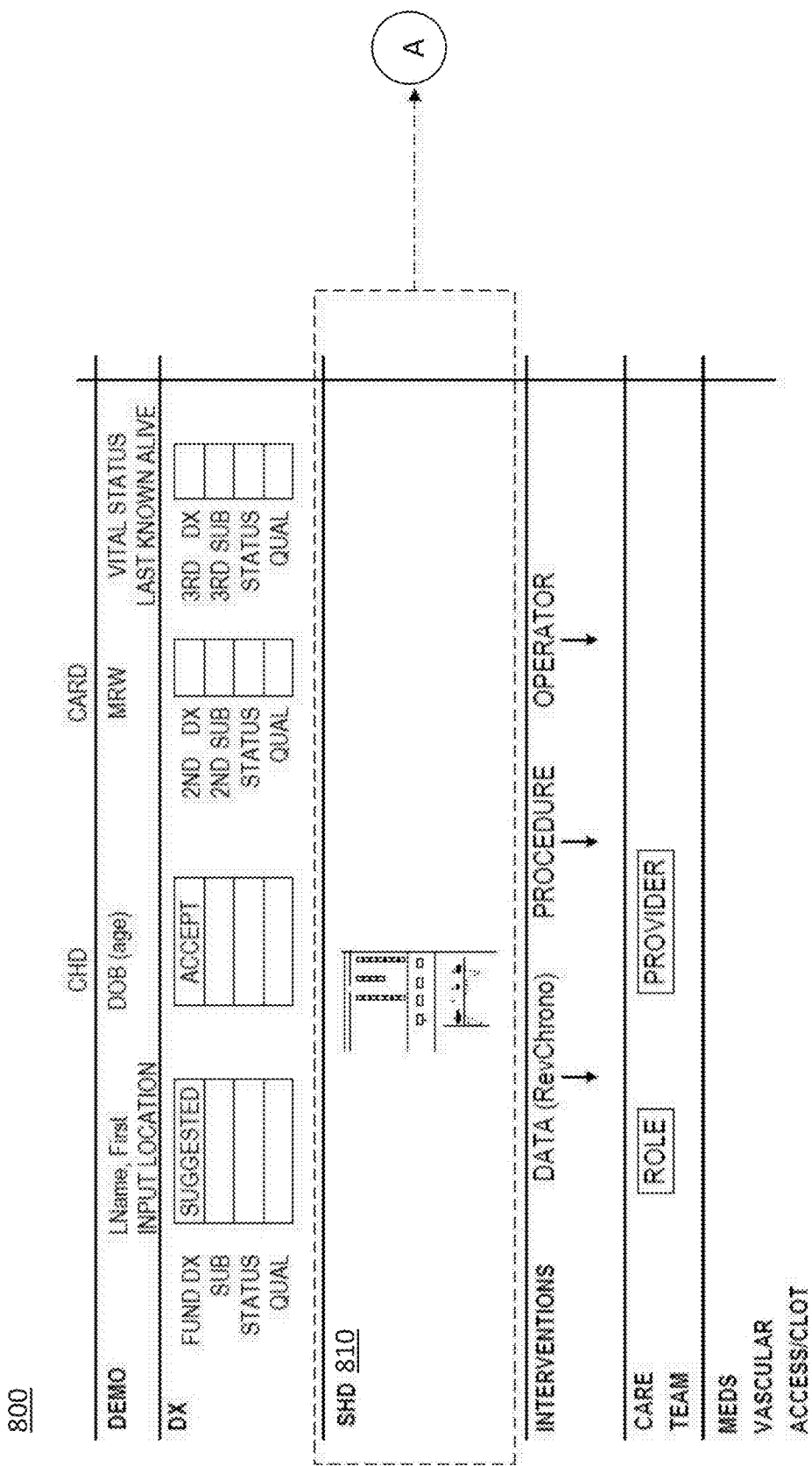

FIG. 8 is a second exemplary screenshot of a CVCP output on graphical user interface (GUI) of a patient-specific information card 800 in accordance with one or more embodiments of the present disclosure. The patient-specific information card 800 may also be referred to as a patient baseball card that may include a collective summary of the patient-specific data. The patient-specific information card 800 may include collapsible sections. For example, a user clicking on the structural heart disease (SHD) section 810 as shown FIG. 8 may open an expanded window A of the SHD section 810 as shown in FIG. 8.

In some embodiments, the patient-specific information card 800 may be generated Microsoft's Power BI service.

In some embodiments, the patient-specific information card 800 may include data field such as but are not limited to an indication of a particular hospital, vital status (date last known alive), DX (diagnosis), medical status changes, an implant log, dates of visits to clinic, hospital emergency department (ED), Inpatient (Int), intensive card unit (ICU), and/or Admission, Discharge, transfer (ADT) dates. The patient-specific information card may further known members of the patient's care team such as cardiac surgeons and/or primary cardiologists, for example, and patient contact information.

FIG. 9 is a table 900 for determining a severity score based on different cardiac defects and/or dysfunctions in accordance with one or more embodiments of the present disclosure. The table 900 may refer to a list of cardiac defects and/or dysfunctions (FUND) 910 such as for example, APW: Aortopulmonary Window (congenital heart defect)
ASD: Atrial Septal Defect (congenital heart defect)
AVC: Atrioventricular Canal Defect (congenital heart defect)
CARDIOMYOPATHY: Disease of the heart muscle that makes it difficult for the heart to pump blood effectively.
CoA and Arch: Coarctation of the Aorta and Aortic Arch (narrowing of the aorta)
CORONARY: Pertaining to the coronary arteries, which supply blood to the heart muscle.
CorTri: Tricuspid atresia (congenital heart defect where the tricuspid valve is missing).
DOLV: Double Outlet Left Ventricle (congenital heart defect)
DORV: Double Outlet Right Ventricle (congenital heart defect)
HETEROTAXY: A condition where internal organs are located in an abnormal position.
LVOT and Root: Left Ventricular Outflow Tract and Root (area surrounding the aortic valve)
MV: Mitral Valve (valve between the left atrium and left ventricle)
PAPVC: Partial Anomalous Pulmonary Venous Connection (pulmonary veins connect abnormally to the right atrium)
PArt: Pulmonary Atresia (atresia means blockage, in this case of the pulmonary valve)
PA-IVS: Pulmonic Valve Insufficiency (failure of the pulmonic valve to close properly).
PHTN: Pulmonary Hypertension (high blood pressure in the pulmonary arteries).
RHYTHM: Refers to the heart's electrical activity and beating pattern
RVOT and PV: Right Ventricular Outflow Tract and Pulmonary Valve (area surrounding the pulmonic valve)
SingleV: Single Ventricle (congenital heart defect with only one functional ventricle)
Shone's: Shone Complex (congenital heart defect involving multiple abnormalities)

TAPVC: Total Anomalous Pulmonary Venous Connection (all pulmonary veins connect abnormally)

TGA: Transposition of the Great Arteries (aorta and pulmonary artery are switched)

TGA-cc: Transposition of the Great Arteries with corrected circulation (TGA with a septal defect allowing some mixing of blood)

ToF w PAtresia: Tetralogy of Fallot with Pulmonary Atresia (combination of four heart defects with absent pulmonary valve).

TRUNCUS: Truncus Arteriosus (congenital heart defect with a single major vessel arising from the heart)

TV: Tricuspid Valve (valve between the right atrium and right ventricle)

VMAL: Ventricular Myocardial Aberrations of the Left ventricle (abnormalities of the heart muscle in the left ventricle)

VSD: Ventricular Septal Defect (congenital heart defect with a hole in the wall separating the ventricles)

In some embodiments, the table 900 may include fundamental diagnosis (FUND) and nested sub-diagnoses (SUB) shown in the table 900 as FUND 910, SUB 920 and defect STATUS 930 as well as associated weights W1 915 for FUND 910, W2 925 for SUB 920, and W3 935 for STATUS 930. The severity score 740 may range from 0-10 and based on the type of heart defect. The severity score (SEV) 740 may be computed as the sum of the weights as in Equation (1):

$$SEV = W1 + W2 + W3. \quad (1)$$

In some embodiments, a triage score may be computed as in Equation (2):

$$\text{Triage Score} = SEV*FU \quad (2)$$

where FU is the follow-up weight given by:

$$\text{Follow-up Weight (FU): } 1 + (\text{number of months since last cardiology visit}/24) \quad (3)$$

The number of months since the last medical visit may be registered, for example, in the patient-specific medical data.

In some embodiments, follow-up weighting (FU) may be capped at 1 for the following heart defects: Ventricular Myocardial Aberrations of the Left ventricle (VMAL) and Patent ductus arteriosus (PDA).

In some embodiments, a triage score from a triage scoring algorithm for each of the plurality of identified patients may be based at least in part on the HD severity score, and a provider-visit weight based on at least one date of the at least one visit to the at least one provider as shown for example in Equation (3).

In some embodiments, a machine learning model may include a fine-tuned transformer encoder based on the Longformer model only. The hidden layers of the machine learning model may reside within standard transformer blocks, each of which may include a multi-head attention mechanism and a feed-forward neural network. The encoder may include, for example, 12 sequential blocks. For a loss factor, a cross entropy loss function may be used. Propagation factors may include a model forward pass at prediction time that may move through the encoder sequentially from block to block. Back propagation may be performed in reverse during training. Hyperparameters may include parameters such as the number of blocks, attention heads, dropout, learning rate, number of training epochs, etc., for example, which may all impact the architecture and performance of the model.

In some embodiments, the machine learning model may be trained to trained to directly output the triage score where the MLM receives tokenized inputs not only of the echocardiogram report but also the medical record of the patient including the number of months since the doctor last provided cardiac medical care to the patient. In this case, the MLM directly outputs the triage score and/or the severity score instead of computing the triage score in a post-processing step based on the severity score (e.g., as per equation (2))

In some embodiments, the machine learning model may be trained on roughly 2,000 echo reports using the tokenized text from the echo report. The database may have access to patient data that may include 10 million echocardiograms. If the CVCP 106 algorithms determine that there may be CHD suspected, the CVCP 106 may flag the patient as CHD suspected. If a patient has suspected congenital heart disease, the doctor may confirm or reject the automated assessment.

In some embodiments, the machine learning models may be periodically retrained on datasets that verify disease predictions to the doctor-verified predications.

In some embodiments, once the suspected CHD predicted by the machine learning model has been confirmed with a confirmed diagnostic flag, this may follow this patient for their entire life, which is important since these patients get life-long care from birth until end of life and that diagnosis while the status might change never goes away.

In some embodiments, the CVCP platform 106 may be configured to track patient follow-up visits. For example, after a patient had an operation to correct a particular heart defect, the doctor may instruct the patient to return for a follow-up visit. If the patient does not return a scheduled follow up visit, the patient may appear on the ranked triage-score patient severity list 705. The doctor via GUI 17A ... 17B may receive an alert to initiate outreach for a follow-up visit.

In some embodiments, the CVCP platform 106 may be integrated with the patient electronic medical records (EMR). In other embodiments, the EMR records may be managed by software developed by Epic Systems, Inc.

In some embodiments, the patient-finder system implementing the patient finder high level architecture 300 may be a broader system solution for looking for other diseases using other medical imaging data such as, for example. pancreatic cancer in CAT scans. The patient finder system may also be used search the patient database to identify for example, diabetics with a hemoglobin A1C (HbA1C) greater than seven.

In some embodiments, the patient-finder system may use custom models for different disease sites. In other embodiments, the patient-finder system may deploy and utilize custom models for each disease site, and may leverage large pretrained machine learning models from Google or Azure.

In some embodiments, the methods disclosed herein may provide a technical solution combine machine learning models with diagnostic verification to provide the best accuracy for diagnostic information, that may serve as a ground truth that may resolve often conflicting diagnostic data within the EMR. The nested diagnostic trees and status fields shown in FIG. 9 may provide the proper balance of speed and accuracy to minimally impact workflows and maximize efficiency of patient verification and capture. In addition, incorporation of ADT and visit history data may allow for real time triage and targeted outreach that facilitates care gap closure and is a feature of most currently available screening tools.

In some embodiments, the CVCP 106 may identify congenital heart disease patients, however the methods disclosed herein may be easily adapted to utilize any form of structured and semi-structured data for any disease. Echocardiograms may also be screened to identify structural and valvular heart disease and heart failure. Upper and lower extremity vascular ultrasounds and carotid dopplers may be screened to identify peripheral vascular disease patients. Diabetics may be rapidly classified according to specific laboratory data (e.g., Hgb A1C, blood glucose).

In some embodiments, using the CVCP 106, a total of 60,910 echoes from 35,270 patients with suspected congenital heart disease have been retrospectively identified within the Northwell system by Listapp. 1,306 patients have been manually coded using a three-tiered system that may incorporate nested diagnosis trees as well as a status field. Furthermore, an additional 200 echoes may be coded as Normal. Feedback from this cohort may be used to further refine the system. In other embodiments, a rules engine may be implemented to aid in identifying 'Normal' echoes within the remaining 59,000 echoes. Within this cohort, over 100 gaps in care may be identified which may be extrapolated to approximately $5 million in potential lost revenue across the larger CHD population.

In some embodiments, the four-tiered diagnostic system may broadly classify all congenital heart disease based on a fundamental diagnosis and nested sub-diagnoses. The diagnosis tree may be refined from its initial structure (used at Loma Linda) to its current version based on outliers found in the initial classification scheme as well as the elimination of "NOS" (e.g., not otherwise specified) and "other" options. The fourth component (Status) may indicate where in the care map for a given diagnosis the patient is (Palliated, Repaired, Unrepaired, etc). The combination of these four pieces of information may subdivide the CHD patient population into readily identifiable cohorts and balances the need for rapid, accurate diagnostic information with the time required to provide it. A user such as for example a cardiologist, nurse practitioner, ICU physician, and/or surgeon with the appropriate interface may provide or modify this information with minimal impact on existing workflows during any inpatient or outpatient encounter. Disease severity coefficients or scores may be assigned which may be readily combined with the visit history and social determinants of health information to triage follow-up by the primary care team (or CRM).

In some embodiments, the information gained from the four-tiered diagnostic system may be used to refine the CVCP platform design such that a back-end relational database architecture may be developed in an EMR and cloud-agnostic manner for both structural and congenital heart disease. Provider-facing UIs may be designed to allow point of care, prospective push-in of new patients and/or modification of existing patient records. NLP approaches that may be used for parsing and quantification of semi-structured data may be actively tested.

In some embodiments, the CVCP may include a more robust relational database that focuses on unique patients rather than unique echoes that may need to be implemented. Second, a more intuitive interface that may allow real-time access to the CVCP at the point of care as well as the ability to push-in changes to enable efficient, prospective capture. Finally, the CVCP may use an admission, discharge and transfer (ADT) feed to incorporate demographic and provider information as well as visit history that may also be established. This may enable providers to rapidly identify and classify new patients as well triage the population based on diagnostic severity index and visit history such that patients with severe cardiovascular disease and/or defects with missed appointments or long intervals from time last seen may be rise to the top of a targeted outreach list. Patients with less severe or resolved defects may be assigned a lower priority. Refinement of diagnosis prediction via supervised machine learning may further enhance large-scale, retrospective capture of heart disease patients.

In some embodiments, this CVCP platform is not limited to congenital heart disease but may be extended across the cardiovascular disease space to include heart failure, structural/valvular heart disease, coronary artery disease, and/or peripheral vascular disease, for example.

In some embodiments, the CVCP may implement both prospective and retrospective identification of congenital and structural heart disease patients as well as an interface for provider-level access to view and modify data at the point of care. HL7/FHIR may pipe semi-structured echo report and demographic (ADT) data into a cloud-based repository. The echo data may then be parsed into component sections and NLP algorithms may convert the parsed data into discrete, quantized time series data (structural and congenital heart disease) and/or suggest specific diagnostic information (congenital heart disease). This information may be confirmed prospectively at the point of care or retrospectively by any qualified practitioner.

In some embodiments, aggregate population data may be available at the point of care via an intuitive user interface with drill-down capability to allow seamless transition from population-level data to individual patient data. This component may provide rapid access to both long term prognosis and shorter-term changes to support clinical decision made at the point of care with real world evolving data.

In some embodiments, ADT information may be combined with the diagnostic information to stratify the severity of disease, identify patients out of range for follow-up, and/or allow for triaged outreach to close some of the most commonly identified gaps in care. This constellation of the CVCP capabilities may further serve as a foundational bedrock to add services including but not limited to patient-facing educational and telehealth apps, wearable and IoT-based remote monitoring capabilities, CRM-backed outreach, and/or expansion into additional heart disease populations (heart failure, coronary disease) and beyond (diabetes, hypertension).

Some embodiments of the database used in the CVCP platform may be a relational database that may include SQL, for example, may be stored in the cloud and may include all of the datasets that MLM on the AI platform may use. A graphic user interface may be implemented on a mobile application that may also have desktop support in alternate embodiments.

In some embodiments, the database may include a baseball card type data record and may be referred to herein as a baseball card for each individual patient. The baseball card may be populated by information that obtained from back-end server databases for a particular patient and stored to the baseball card record for the particular patient.

In some embodiments, the input features from the data on the baseball card record entry for the particular patient may be inputted into the machine learning AI prediction algorithm to determine whether the particular patient may have congenital heart disease. In other embodiments, this may be performed at any time with patient consent once echo cardiogram data may be attached to the patient's record and may be verified with or without CHD. This is an example of the basic model to close gaps in care.

In some embodiments, a provider facing user interface (e.g., graphic user interface GUI) may then overlay suspected positive results on the echocardiogram results with the inpatient consensus to allow end user verification at the point of care. Once confirmed, the patient may be added to a cloud-based repository of heart disease patients. Diagnostic, demographic, and visit history information may be aggregated and presented in real-time at the point of care using a persona-driven UI that supports mobile and desk-top devices. Proprietary algorithms may combine disease severity scales with ADT data and highlight existing gaps in care. Real-time triage of entire populations via disease-specific dashboards with patient-level drill down capability facilitate targeted outreach and care gap closure.

In some embodiments, the CVCP may convert the echo parameters to tokenized integer values, and other suitable features may be input to the machine learning model to output non-clinical outcomes like admission, other outcomes like patient death, for example. In other embodiments, the CVCP may be trained to output patient states over time analogously to a longitudinal viewer to capture time series data.

In some embodiments, the CVCP may analyze existing health system data and may identify specific cohorts of heart disease patients. Echocardiogram reports may be sorted by machine learning models (MLMs) using binary classifiers for individual cohorts (for example, congenital heart disease). These binary classifiers may be used as input features to the MLMs. In other embodiments, preprocessing algorithms (e.g., CHD discriminator) may be configured to extract the input features from the raw echocardiogram data prior to input to the MLMs. In yet other embodiments, the MLM may be trained to process the raw echocardiogram data.

In some embodiments, the machine learning models may be configured to receive, in part, echo cardiogram reports as the input and its output may be, but is not limited to, discriminating between CHD, or no CHD in the echo cardiogram.

In some embodiments, the CVCP may provide a population level view to drill down to the patient level capabilities, but to avoid a dashboard with 30,000 patients on it, the CVCP may apply an illness score. The CVCP may sort the patient population based on the score, statistical weights to quantify the severity of the illness score combined with the patient visit history data. The sickest patients that are furthest out of range may be at the top of the sorted patient list for a targeted outreach.

In some embodiments, the machine learning model may be trained as initially a binary classifier for outputting a CHD positive subset, and a CHD negative subset. For the positive subset, a second model may be used to output a number of possible main diagnosis, such as 25 main diagnoses for example, that may identify a hole in the heart and provide a list of hole types.

In some embodiments, this approach may be effective in addressing healthcare disparities as socioeconomic data may be incorporated into triaging algorithms. The CVCP may be a multi-tenanted application that may support multiple clients out-of-the-box using common infrastructure and code. The application may be developed in an EMR-agnostic manner. Key components may include a cloud-based integration layer to communicate with any existing HIE ecosystem, a user-facing application with multiple personas to support various roles (clinician, database manager, CRM) and a back-end ML/AI environment to support ML model development, NLP, and clinical decision support tools. The entire system may feature continuous, zero-downtime deployment and maintenance.

In some embodiments, the majority of CHD patients may be diagnosed and monitored by serial echocardiography. Adjunct imaging (CT, MRI, angiography) may be used as well, however >99% of patients with CHD typically undergo echocardiography. The initial phase of CVCP development may a query across the current echocardiography system (Syngo) to identify patients with suspected CHD. Once identified, the relevant information may be extracted and a limited set of high yield information may be collected that delineates the specific diagnosis, repair status, and care location for each patient. An example of the type of data captured is shown in the GUI screenshot 600 of FIG. 6.

In some embodiments, statistical weights may be assigned to reflect the severity of individual diagnoses as well as to stratify the impact of residual unrepaired lesions as shown in FIG. 9. By cross correlating this information with each patient's visit history, the CVCP may assist health care providers to triage and prioritize outreach such that the patient's most at risk for decompensation may be rapidly identified and recaptured. System benefits may include improved outcomes through early intervention, prevention of outmigration and increased market share, and creation of an EMR-agnostic population management tool that may serve as a platform for future development such as outpatient wearable monitoring programs, NLP for diagnosis prediction, and ML/AI approaches for image analysis and decision support.

Figure 10:
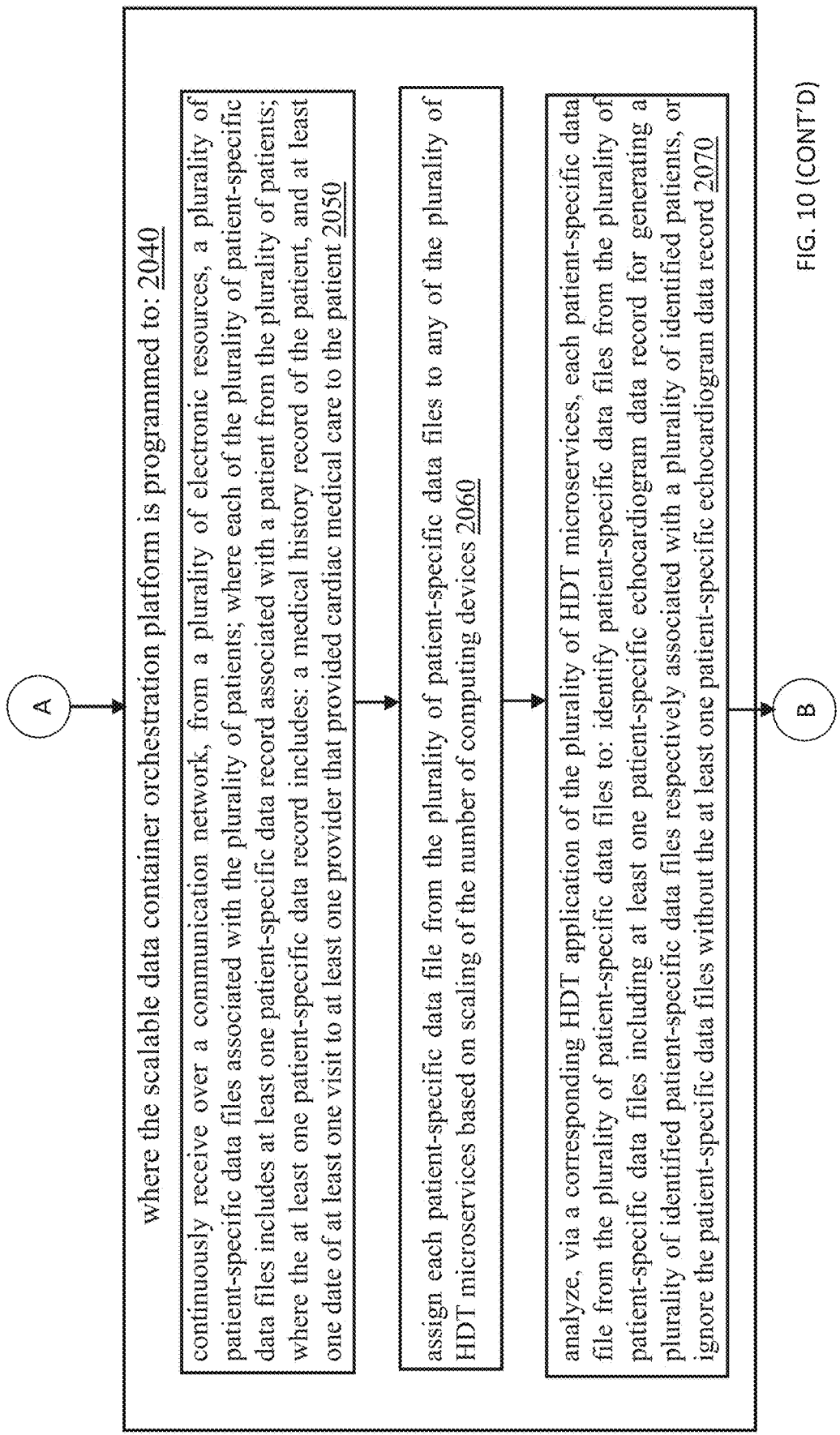
Figure 10:
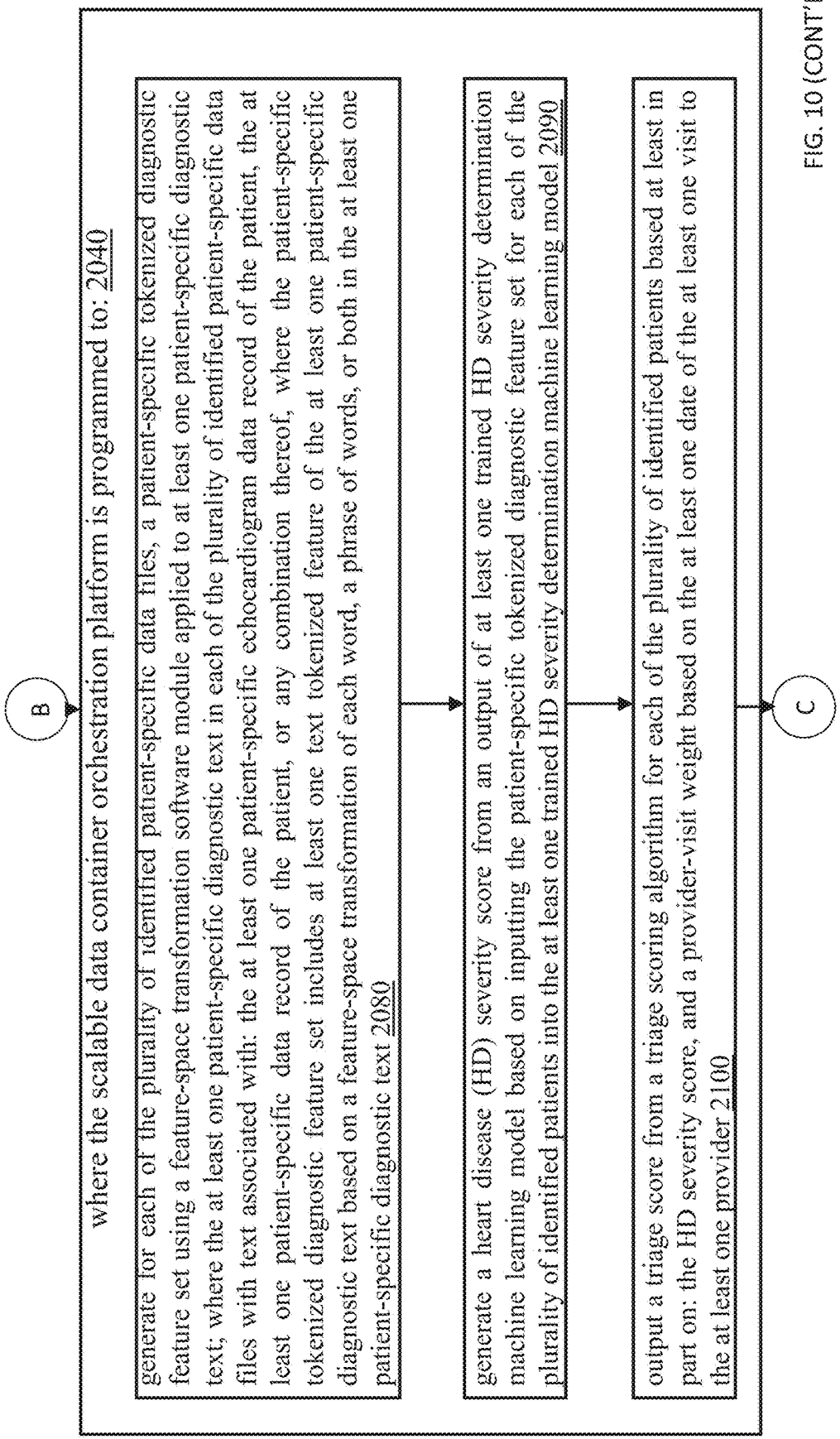

FIG. 10 is a flowchart of a method 2000 for implementing a medical software platform in accordance with one or more embodiments of the present disclosure. The method may be performed by at least one processing device of a plurality of computing devices.

The method 2000 may include executing 2005, by at least one processing device of a plurality of computing devices, a plurality of heart disease triage (HDT) microservices operating on a scalable data container orchestration platform; where the scalable data container orchestration platform, includes at least one load balancer, and The method 2000 may include the scalable data container orchestration platform configured to dynamically scale 2010 a number of computing devices based on data traffic assessed by the at least one load balancer for the plurality of HDT microservices to maximize computational and load efficiencies in the plurality of computing devices.

The method 2000 may include the scalable data container orchestration platform configured to interact 2020 with a plurality of backend computing devices associated with a plurality of providers through an application programming interface (API) layer including a plurality of APIs.

The method 2000 may include the scalable data container orchestration platform configured to relay data 2030 associated with a plurality of patients between any of the plurality of backend computing devices and the plurality of HDT microservices.

The method 2000 may include the scalable data container orchestration platform programmed 2040 to continuously receive 2050 over a communication network, from a plurality of electronic resources, a plurality of patient-specific data files associated with the plurality of patients; where each of the plurality of patient-specific data files includes at least one patient-specific data record associated with a patient from the plurality of patients; where the at least one patient-specific data record includes: a medical history record of the patient, and at least one date of at least one visit to at least one provider that provided cardiac medical care to the patient.

The method 2000 may include the scalable data container orchestration platform programmed 2040 to assign 2060 each patient-specific data file from the plurality of patient-specific data files to any of the plurality of HDT microservices based on scaling of the number of computing devices The method 2000 may include the scalable data container orchestration platform programmed 2040 to analyze 2070, via a corresponding HDT application of the plurality of HDT microservices, each patient-specific data file from the plurality of patient-specific data files to: identify patient-specific data files from the plurality of patient-specific data files including at least one patient-specific echocardiogram data record for generating a plurality of identified patient-specific data files respectively associated with a plurality of identified patients, or ignore the patient-specific data files without the at least one patient-specific echocardiogram data record.

The method 2000 may include the scalable data container orchestration platform programmed 2040 to generate 2080 for each of the plurality of identified patient-specific data files, a patient-specific tokenized diagnostic feature set using a feature-space transformation software module applied to at least one patient-specific diagnostic text; where the at least one patient-specific diagnostic text in each of the plurality of identified patient-specific data files with text associated with: the at least one patient-specific echocardiogram data record of the patient, the at least one patient-specific data record of the patient, or any combination thereof, where the patient-specific tokenized diagnostic feature set includes at least one text tokenized feature of the at least one patient-specific diagnostic text based on a feature-space transformation of each word, a phrase of words, or both in the at least one patient-specific diagnostic text.

The method 2000 may include the scalable data container orchestration platform programmed 2040 to generate 2090 a heart disease (HD) severity score from an output of at least one trained HD severity determination machine learning model based on inputting the patient-specific tokenized diagnostic feature set for each of the plurality of identified patients into the at least one trained HD severity determination machine learning model.

The method 2000 may include the scalable data container orchestration platform programmed 2040 to output 2100 a triage score from a triage scoring algorithm for each of the plurality of identified patients based at least in part on: the HD severity score, and a provider-visit weight based on the at least one date of the at least one visit to the at least one provider.

The method 2000 may include the scalable data container orchestration platform programmed 2040 to generate 2110 a triage-score patient severity list ranked from a highest triage score to a lowest triage score, for each identified patient associated with each identified patient-specific data file from the plurality of identified patient-specific data files; where the triage-score patient severity list indicates a set of the plurality of identified patients that should first receive urgent care.

The method 2000 may include the scalable data container orchestration platform programmed 2040 to transmit 2120, via the API layer, at least one displaying instruction, to at least one specific backend computing devices from the plurality of backend computing devices associated with at least one specific provider from the plurality of providers that provided cardiac medical care to any of the plurality of identified patients in the set, that causes to display on a graphical user interface (GUI) on at least one display of the specific backend computing devices: the triage-score patient severity list, an urgent medical care alert for each identified patient in the set, or both.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21).NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications for implementing the functions of the CVCP as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

In some embodiments, exemplary inventive computer-based systems/platforms, exemplary inventive computer-based devices, and/or exemplary inventive computer-based components of the present disclosure may be configured to handle numerous concurrent users via the N user devices 16A and 16B that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

FIG. 5 depicts a block diagram of second embodiment of computer-based system 500 for implementing the CVCP platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502*a*, 502*b* thru 502*n* (e.g., user devices used by platform users such as physicians and/or providers) shown each at least includes a computer-readable medium, such as a random-access memory (RAM) 508 coupled to a processor 510 or FLASH memory. In some embodiments, the processor 510 may execute computer-executable program instructions stored in memory 508 for implementing the functions of the CVCP software tool. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein for implementing the functions of the CVCP. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also include a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein for implementing the functions of the CVCP. In some embodiments, member computing devices 502a through 502n may operate on any operating system capable of supporting a browser or browser-enabled application, such as Microsoft™, Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 5, exemplary server devices 504 and 513 may be also coupled to the network 506 for implementing the functions of the CVCP. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database for implementing the functions of the CVCP. In some embodiments, the exemplary DBMS-managed database may be specifically programmed to provide the ability to query, backup and replicate, enforce rules, provide security, compute, perform change and access logging, and/or automate optimization for implementing the functions of the CVCP. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS).

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques for implementing the functions of the CVCP software tool chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, a method may include executing, by at least one processing device of a plurality of computing devices, a plurality of heart disease triage (HDT) microservices operating on a scalable data container orchestration platform; where the scalable data container orchestration platform, includes at least one load balancer, and may be configured to: dynamically scale a number of computing devices based on data traffic assessed by the at least one load balancer for the plurality of HDT microservices to maximize computational and load efficiencies in the plurality of computing devices, interact with a plurality of backend computing devices associated with a plurality of providers through an application programming interface (API) layer comprising a plurality of APIs, and relay data associated with a plurality of patients between any of the plurality of backend computing devices and the plurality of HDT microservices. The scalable data container orchestration platform is programmed to continuously receive over a communication network, from a plurality of electronic resources, a plurality of patient-specific data files associated with the plurality of patients; where each of the plurality of patient-specific data files may include at least one patient-specific data record associated with a patient from the plurality of patients; where the at least one patient-specific data record may include: a medical history record of the patient, and at least one date of at least one visit to at least one provider that provided cardiac medical care to the patient; assign each patient-specific data file from the plurality of patient-specific data files to any of the plurality of HDT microservices based on scaling of the number of computing devices; analyze, via a corresponding HDT application of the plurality of HDT microservices, each patient-specific data file from the plurality of patient-specific data files to: identify patient-specific data files from the plurality of patient-specific data files including at least one patient-specific echocardiogram data record for generating a plurality of identified patient-specific data files respectively associated with a plurality of identified patients, or ignore the patient-specific data files without the at least one patient-specific echocardiogram data record; generate for each of the plurality of identified patient-specific data files, a patient-specific tokenized diagnostic feature set using a feature-space transformation software module applied to at least one patient-specific diagnostic text; where the at least one patient-specific diagnostic text in each of the plurality of identified patient-specific data files with text associated with: the at least one patient-specific echocardiogram data record of the patient, the at least one patient-specific data record of the patient, or any combination thereof, where the patient-specific tokenized diagnostic feature set may include at least one text tokenized feature of the at least one patient-specific diagnostic text based on a feature-space transformation of each word, a phrase of words, or both in the at least one patient-specific diagnostic text; generate a heart disease (HD) severity score from an output of at least one trained HD severity determination machine learning model based on inputting the patient-specific tokenized diagnostic feature set for each of the plurality of identified patients into the at least one trained HD severity determination machine learning model; output a triage score from a triage scoring algorithm for each of the plurality of identified patients based at least in part on: the HD severity score, and a provider-visit weight based on the at least one date of the at least one visit to the at least one provider; generate a triage-score patient severity list ranked from a highest triage score to a lowest triage score, for each identified patient associated with each identified patient-specific data file from the plurality of identified patient-specific data files; where the triage-score patient severity list may indicate a set of the plurality of identified patients that should first receive urgent care; and transmit, via the API layer, at least one displaying instruction, to at least one specific backend computing devices from the plurality of backend computing devices associated with at least one specific provider from the plurality of providers that provided cardiac medical care to any of the plurality of identified patients in the set, that causes to display on a graphical user interface (GUI) on at least one display of the specific backend computing devices: the triage-score patient severity list, an urgent medical care alert for each identified patient in the set, or both.

In some embodiments, each of the plurality of patient-specific data files may be formatted in a Fast Healthcare Interoperability Resources (FHIR) format.

In some embodiments, the scalable data container orchestration platform may be programmed to receive over the communication network, the plurality of patient-specific data files stored in a plurality of patient-specific data containers, a plurality of patient-specific data messages, or any combination thereof.

In some embodiments, the at least one trained HD severity determination machine learning model may be a transformer encoder based on a Longformer model.

In some embodiments, each of the plurality of HDT microservices may include at least one handler; and where the scalable data container orchestration platform may be programmed to publish, using the at least one handler, HD-indicative observations in each patient-specific data file for each patient received over the communication network, and to analyze each patient-specific data file for each patient to identify the at least one patient-specific echocardiogram data record by analyzing the HD-indicative observations.

In some embodiments, the scalable data container orchestration platform may be Kubernetes.

In some embodiments, each of the plurality of heart disease triage (HDT) microservices may be a containerized microservice.

In some embodiments, the scalable data container orchestration platform may be further programmed to generate at least one predicted HD diagnosis from the output of the at least one trained HD severity determination machine learning model.

In some embodiments, the at least one predicted HD diagnosis may include a normal heart diagnosis, or at least one of: a congenital heart disease (CHD) diagnosis, a structural heart disease (SHD) diagnosis, a congestive heart failure (CHF) diagnosis, a coronary artery disease (CAD) diagnosis, or a peripheral vascular disease (PVD) diagnosis.

In some embodiments, the scalable data container orchestration platform may be further programmed to transmit the at least one displaying instruction that causes to display on the graphical user interface (GUI) of the at least one specific provider: a selectable GUI element allowing the at the least one specific provider to select a selected patient from the set of the plurality of identified patients in the triage-score patient severity list, and a patient medical summary of the selected patient.

In some embodiments, a system may include a scalable data container orchestration platform, including at least one processing device of a plurality of computing devices that operate a plurality of heart disease triage (HDT) microservices; and at least one load balancer. The scalable data container orchestration platform configured to dynamically scale a number of computing devices based on data traffic assessed by the at least one load balancer for the plurality of HDT microservices to maximize computational and load efficiencies in the plurality of computing devices, interact with a plurality of backend computing devices associated with a plurality of providers through an application programming interface (API) layer comprising a plurality of APIs, and relay data associated with a plurality of patients between any of the plurality of backend computing devices and the plurality of HDT microservices. The scalable data container orchestration platform may be programmed to continuously receive over a communication network, from a plurality of electronic resources, a plurality of patient-specific data files associated with the plurality of patients; where each of the plurality of patient-specific data files may include at least one patient-specific data record associated with a patient from the plurality of patients; where the at least one patient-specific data record may include: a medical history record of the patient, and at least one date of at least one visit to at least one provider that provided cardiac medical care to the patient; assign each patient-specific data file from the plurality of patient-specific data files to any of the plurality of HDT microservices based on scaling of the number of computing devices; analyze, via a corresponding HDT application of the plurality of HDT microservices, each patient-specific data file from the plurality of patient-specific data files to: identify patient-specific data files from the plurality of patient-specific data files comprising at least one patient-specific echocardiogram data record for generating a plurality of identified patient-specific data files respectively associated with a plurality of identified patients, or ignore the patient-specific data files without the at least one patient-specific echocardiogram data record; generate for each of the plurality of identified patient-specific data files, a patient-specific tokenized diagnostic feature set using a feature-space transformation software module applied to at least one patient-specific diagnostic text; where the at least one patient-specific diagnostic text in each of the plurality of identified patient-specific data files with text associated with: the at least one patient-specific echocardiogram data record of the patient, the at least one patient-specific data record of the patient, or any combination thereof, where the patient-specific tokenized diagnostic feature set may include at least one text tokenized feature of the at least one patient-specific diagnostic text based on a feature-space transformation of each word, a phrase of words, or both in the at least one patient-specific diagnostic text; generate a heart disease (HD) severity score from an output of at least one trained HD severity determination machine learning model based on inputting the patient-specific tokenized diagnostic feature set for each of the plurality of identified patients into the at least one trained HD severity determination machine learning model; output a triage score from a triage scoring algorithm for each of the plurality of identified patients based at least in part on: the HD severity score, and a provider-visit weight based on the at least one date of the at least one visit to the at least one provider; generate a triage-score patient severity list ranked from a highest triage score to a lowest triage score, for each identified patient associated with each identified patient-specific data file from the plurality of identified patient-specific data files; where the triage-score patient severity list may indicate a set of the plurality of identified patients that should first receive urgent care; and transmit, via the API layer, at least one displaying instruction, to at least one specific backend computing devices from the plurality of backend computing devices associated with at least one specific provider from the plurality of providers that provided cardiac medical care to any of the plurality of identified patients in the set, that causes to display on a graphical user interface (GUI) on at least one display of the specific backend computing devices: the triage-score patient severity list, an urgent medical care alert for each identified patient in the set, or both.

In some embodiments, each of the plurality of patient-specific data files may be formatted in a Fast Healthcare Interoperability Resources (FHIR) format.

In some embodiments, the scalable data container orchestration platform may be programmed to receive over the communication network, the plurality of patient-specific data files stored in a plurality of patient-specific data containers, a plurality of patient-specific data messages, or any combination thereof.

In some embodiments, the at least one trained HD severity determination machine learning model may be a transformer encoder based on a Longformer model.

In some embodiments, each of the plurality of HDT microservices may include at least one handler; and where the scalable data container orchestration platform may be programmed to publish, using the at least one handler, HD-indicative observations in each patient-specific data file for each patient received over the communication network, and to analyze each patient-specific data file for each patient to identify the at least one patient-specific echocardiogram data record by analyzing the HD-indicative observations.

In some embodiments, the scalable data container orchestration platform may be Kubernetes.

In some embodiments, each of the plurality of heart disease triage (HDT) microservices may be a containerized microservice.

In some embodiments, the scalable data container orchestration platform may be further programmed to generate at least one predicted HD diagnosis from the output of the at least one trained HD severity determination machine learning model.

In some embodiments, the at least one predicted HD diagnosis may include a normal heart diagnosis, or at least one of: a congenital heart disease (CHD) diagnosis, a structural heart disease (SHD) diagnosis, a congestive heart failure (CHF) diagnosis, a coronary artery disease (CAD) diagnosis, or a peripheral vascular disease (PVD) diagnosis.

In some embodiments, the scalable data container orchestration platform may be further programmed to transmit the at least one displaying instruction that causes to display on the graphical user interface (GUI) of the at least one specific provider: a selectable GUI element allowing the at the least one specific provider to select a selected patient from the set of the plurality of identified patients in the triage-score patient severity list, and a patient medical summary of the selected patient.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method, comprising:
executing, by at least one processing device of a plurality of computing devices, a plurality of heart disease triage (HDT) microservices operating on a scalable data container orchestration platform;
wherein the scalable data container orchestration platform, comprises at least one load balancer, and is configured to:
dynamically scale a number of computing devices based on data traffic assessed by the at least one load balancer for the plurality of HDT microservices to maximize computational and load efficiencies in the plurality of computing devices,
interact with a plurality of backend computing devices associated with a plurality of providers through an application programming interface (API) layer comprising a plurality of APIs, and
relay data associated with a plurality of patients between any of the plurality of backend computing devices and the plurality of HDT microservices;
wherein the scalable data container orchestration platform is programmed to:
continuously receive over a communication network, from a plurality of electronic resources, a plurality of patient-specific data files associated with the plurality of patients;
wherein each of the plurality of patient-specific data files comprises at least one patient-specific data record associated with a patient from the plurality of patients;
wherein the at least one patient-specific data record comprises:
a medical history record of the patient, and
at least one date of at least one visit to at least one provider that provided cardiac medical care to the patient;
assign each patient-specific data file from the plurality of patient-specific data files to any of the plurality of HDT microservices based on scaling of the number of computing devices;
analyze, via a corresponding HDT application of the plurality of HDT microservices, each patient-specific data file from the plurality of patient-specific data files to:
identify patient-specific data files from the plurality of patient-specific data files comprising at least one patient-specific echocardiogram data record for generating a plurality of identified patient-specific data files respectively associated with a plurality of identified patients, or
ignore the patient-specific data files without the at least one patient-specific echocardiogram data record;
generate for each of the plurality of identified patient-specific data files, a patient-specific tokenized diagnostic feature set using a feature-space transformation software module applied to at least one patient-specific diagnostic text;
wherein the at least one patient-specific diagnostic text in each of the plurality of identified patient-specific data files with text associated with:
the at least one patient-specific echocardiogram data record of the patient,
the at least one patient-specific data record of the patient, or
any combination thereof;
wherein the patient-specific tokenized diagnostic feature set comprises at least one text tokenized feature of the at least one patient-specific diagnostic text based on a feature-space transformation of each word, a phrase of words, or both in the at least one patient-specific diagnostic text;
generate a heart disease (HD) severity score from an output of at least one trained HD severity determination machine learning model based on inputting the patient-specific tokenized diagnostic feature set for each of the plurality of identified patients into the at least one trained HD severity determination machine learning model;
output a triage score from a triage scoring algorithm for each of the plurality of identified patients based at least in part on:
the HD severity score, and
a provider-visit weight based on the at least one date of the at least one visit to the at least one provider;
generate a triage-score patient severity list ranked from a highest triage score to a lowest triage score, for each identified patient associated with each identified patient-specific data file from the plurality of identified patient-specific data files;
wherein the triage-score patient severity list indicates a set of the plurality of identified patients that should first receive urgent care; and
transmit, via the API layer, at least one displaying instruction, to at least one specific backend computing devices from the plurality of backend computing devices associated with at least one specific provider from the plurality of providers that provided cardiac medical care to any of the plurality of identified patients in the set, that causes to display on a graphical user interface (GUI) on at least one display of the specific backend computing devices:
the triage-score patient severity list,
an urgent medical care alert for each identified patient in the set,
or both.

2. The method according to claim 1, wherein each of the plurality of patient-specific data files is formatted in a Fast Healthcare Interoperability Resources (FHIR) format.

3. The method according to claim 1, wherein the scalable data container orchestration platform is programmed to receive over the communication network, the plurality of patient-specific data files stored in a plurality of patient-specific data containers, a plurality of patient-specific data messages, or any combination thereof.

4. The method according to claim 1, wherein the at least one trained HD severity determination machine learning model is a transformer encoder based on a Longformer model.

5. The method according to claim 1, wherein each of the plurality of HDT microservices comprises at least one handler; and wherein the scalable data container orchestration platform is programmed to publish, using the at least one handler, HD-indicative observations in each patient-specific data file for each patient received over the communication network, and to analyze each patient-specific data file for each patient to identify the at least one patient-specific echocardiogram data record by analyzing the HD-indicative observations.

6. The method according to claim 1, wherein the scalable data container orchestration platform is Kubernetes.

7. The method according to claim 1, wherein each of the plurality of heart disease triage (HDT) microservices is a containerized microservice.

8. The method according to claim 1, wherein the scalable data container orchestration platform is further programmed to generate at least one predicted HD diagnosis from the output of the at least one trained HD severity determination machine learning model.

9. The method according to claim 8, wherein the at least one predicted HD diagnosis comprises a normal heart diagnosis, or at least one of:
a congenital heart disease (CHD) diagnosis,
a structural heart disease (SHD) diagnosis,
a congestive heart failure (CHF) diagnosis,
a coronary artery disease (CAD) diagnosis, or
a peripheral vascular disease (PVD) diagnosis.

10. The method according to claim 1, wherein the scalable data container orchestration platform is further programmed to transmit the at least one displaying instruction that causes to display on the graphical user interface (GUI) of the at least one specific provider:
a selectable GUI element allowing the at the least one specific provider to select a selected patient from the set of the plurality of identified patients in the triage-score patient severity list, and
a patient medical summary of the selected patient.

11. A system, comprising:
a scalable data container orchestration platform, comprising:
at least one processing device of a plurality of computing devices that operate a plurality of heart disease triage (HDT) microservices; and
at least one load balancer;
wherein the scalable data container orchestration platform configured to:
dynamically scale a number of computing devices based on data traffic assessed by the at least one load balancer for the plurality of HDT microservices to maximize computational and load efficiencies in the plurality of computing devices,
interact with a plurality of backend computing devices associated with a plurality of providers through an application programming interface (API) layer comprising a plurality of APIs, and
relay data associated with a plurality of patients between any of the plurality of backend computing devices and the plurality of HDT microservices;
wherein the scalable data container orchestration platform is programmed to:
continuously receive over a communication network, from a plurality of electronic resources, a plurality of patient-specific data files associated with the plurality of patients;
wherein each of the plurality of patient-specific data files comprises at least one patient-specific data record associated with a patient from the plurality of patients;
wherein the at least one patient-specific data record comprises:
a medical history record of the patient, and
at least one date of at least one visit to at least one provider that provided cardiac medical care to the patient;
assign each patient-specific data file from the plurality of patient-specific data files to any of the plurality of HDT microservices based on scaling of the number of computing devices;
analyze, via a corresponding HDT application of the plurality of HDT microservices, each patient-specific data file from the plurality of patient-specific data files to:
identify patient-specific data files from the plurality of patient-specific data files comprising at least one patient-specific echocardiogram data record for generating a plurality of identified patient-specific data files respectively associated with a plurality of identified patients, or
ignore the patient-specific data files without the at least one patient-specific echocardiogram data record;
generate for each of the plurality of identified patient-specific data files, a patient-specific tokenized diagnostic feature set using a feature-space transformation software module applied to at least one patient-specific diagnostic text;
wherein the at least one patient-specific diagnostic text in each of the plurality of identified patient-specific data files with text associated with:
the at least one patient-specific echocardiogram data record of the patient,
the at least one patient-specific data record of the patient, or
any combination thereof,
wherein the patient-specific tokenized diagnostic feature set comprises at least one text tokenized feature of the at least one patient-specific diagnostic text based on a feature-space transformation of each word, a phrase of words, or both in the at least one patient-specific diagnostic text;
generate a heart disease (HD) severity score from an output of at least one trained HD severity determination machine learning model based on inputting the patient-specific tokenized diagnostic feature set for each of the plurality of identified patients into the at least one trained HD severity determination machine learning model;
output a triage score from a triage scoring algorithm for each of the plurality of identified patients based at least in part on:
the HD severity score, and
a provider-visit weight based on the at least one date of the at least one visit to the at least one provider;
generate a triage-score patient severity list ranked from a highest triage score to a lowest triage score, for each identified patient associated with each identified patient-specific data file from the plurality of identified patient-specific data files;
wherein the triage-score patient severity list indicates a set of the plurality of identified patients that should first receive urgent care; and
transmit, via the API layer, at least one displaying instruction, to at least one specific backend computing devices from the plurality of backend computing devices associated with at least one specific provider from the plurality of providers that provided cardiac medical care to any of the plurality of identified patients in the set, that causes to display on a graphical user interface (GUI) on at least one display of the specific backend computing devices:
the triage-score patient severity list,
an urgent medical care alert for each identified patient in the set,
or both.

12. The system according to claim 11, wherein each of the plurality of patient-specific data files is formatted in a Fast Healthcare Interoperability Resources (FHIR) format.

13. The system according to claim 11, wherein the scalable data container orchestration platform is programmed to receive over the communication network, the plurality of patient-specific data files stored in a plurality of patient-specific data containers, a plurality of patient-specific data messages, or any combination thereof.

14. The system according to claim 11, wherein the at least one trained HD severity determination machine learning model is a transformer encoder based on a Longformer model.

15. The system according to claim 11, wherein each of the plurality of HDT microservices comprises at least one handler; and
wherein the scalable data container orchestration platform is programmed to publish, using the at least one handler, HD-indicative observations in each patient-specific data file for each patient received over the communication network, and to analyze each patient-specific data file for each patient to identify the at least one patient-specific echocardiogram data record by analyzing the HD-indicative observations.

16. The system according to claim 11, wherein the scalable data container orchestration platform is Kubernetes.

17. The system according to claim 11, wherein each of the plurality of heart disease triage (HDT) microservices is a containerized microservice.

18. The system according to claim 11, wherein the scalable data container orchestration platform is further programmed to generate at least one predicted HD diagnosis from the output of the at least one trained HD severity determination machine learning model.

19. The system according to claim 18, wherein the at least one predicted HD diagnosis comprises a normal heart diagnosis, or at least one of:
a congenital heart disease (CHD) diagnosis,
a structural heart disease (SHD) diagnosis,
a congestive heart failure (CHF) diagnosis,
a coronary artery disease (CAD) diagnosis, or
a peripheral vascular disease (PVD) diagnosis.

20. The system according to claim 11, wherein the scalable data container orchestration platform is further programmed to transmit the at least one displaying instruction that causes to display on the graphical user interface (GUI) of the at least one specific provider:
a selectable GUI element allowing the at the least one specific provider to select a selected patient from the set of the plurality of identified patients in the triage-score patient severity list, and
a patient medical summary of the selected patient.

* * * * *